United States Patent
Iyama et al.

(10) Patent No.: US 9,788,270 B2
(45) Date of Patent: Oct. 10, 2017

(54) OPTICAL-WIRELESS ACCESS SYSTEM

(71) Applicant: NIPPON TELEGRAPH AND TELEPHONE CORPORATION, Tokyo (JP)

(72) Inventors: Noriko Iyama, Yokosuka (JP); Jun-ichi Kani, Yokosuka (JP); Naotaka Shibata, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 205 days.

(21) Appl. No.: 14/654,783

(22) PCT Filed: Dec. 17, 2013

(86) PCT No.: PCT/JP2013/083779
§ 371 (c)(1),
(2) Date: Jun. 22, 2015

(87) PCT Pub. No.: WO2014/103804
PCT Pub. Date: Jul. 3, 2014

(65) Prior Publication Data
US 2015/0373640 A1 Dec. 24, 2015

(30) Foreign Application Priority Data
Dec. 25, 2012 (JP) ................... 2012-280865

(51) Int. Cl.
*H04J 14/00* (2006.01)
*H04W 52/02* (2009.01)
(Continued)

(52) U.S. Cl.
CPC .. *H04W 52/0203* (2013.01); *H04B 10/25753* (2013.01); *H04B 10/272* (2013.01);
(Continued)

(58) Field of Classification Search
CPC .......... H04B 10/2575; H04B 10/25752; H04B 10/25753; H04B 10/27; H04J 14/0227; H04J 14/0221
(Continued)

(56) References Cited

U.S. PATENT DOCUMENTS

| 2006/0045524 A1 | 3/2006 | Lee et al. | |
| 2006/0045525 A1* | 3/2006 | Lee | H04B 10/25752 398/71 |
| 2006/0182446 A1* | 8/2006 | Kim | H04B 10/25752 398/72 |

FOREIGN PATENT DOCUMENTS

| CN | 1321011 A | 11/2001 |
| CN | 1741433 A | 3/2006 |

(Continued)

OTHER PUBLICATIONS

International Preliminary Report on Patentability dated Jul. 9, 2015 from corresponding International Application No. PCT/JP2013/083779, 9 pages.
(Continued)

*Primary Examiner* — Hanh Phan
(74) *Attorney, Agent, or Firm* — Ohlandt, Greeley, Ruggiero & Perle, L.L.P.

(57) ABSTRACT

A method of operating an optical-wireless access system, wherein an ONU obtains information on dynamic scheduling control of the optical-wireless access system, information on discontinuous reception control of the optical-wireless access system, or both of them, and such information is used in the ONU or transferred to an OLT and used as parameters of scheduling in the PON and sleep control.

16 Claims, 30 Drawing Sheets

(51) Int. Cl.
      H04B 10/272    (2013.01)
      H04Q 11/00     (2006.01)
      H04B 10/2575   (2013.01)
      H04W 72/12     (2009.01)
      H04W 88/08     (2009.01)
(52) U.S. Cl.
      CPC .... H04Q 11/0067 (2013.01); H04W 72/1289 (2013.01); H04Q 2011/0064 (2013.01); H04Q 2011/0086 (2013.01); H04W 88/085 (2013.01); Y02B 60/50 (2013.01)
(58) Field of Classification Search
      USPC ....... 398/66, 67, 68, 69, 70, 71, 72, 79, 115, 398/98, 99, 100, 116; 370/352, 392, 389, 370/468, 328, 338, 329
      See application file for complete search history.

(56) References Cited

FOREIGN PATENT DOCUMENTS

| | | |
|---|---|---|
| JP | 2011-176555 | 9/2011 |
| JP | 2012-74866 | 4/2012 |

OTHER PUBLICATIONS

Kantarci et al., "Energy-Efficient DBA and QoS in FiWi Networks Constrained to Metro-Access Convergence", IEEE, Jul. 2, 2012, pp. 1-4, We.C3.5, IEEE.

Kantarci et al., "Energy versus Delay Trade-Offs in Metro-Access Convergence", IEEE, Dec. 12, 2012, pp. 132-136, IEEE.

Extended European Search Report dated Nov. 30, 2016 from corresponding European Patent Application No. 13869652.1, 9 pages.

ITU-T Recommendation G.987.3, "10 Gigabit-capable passive optical networks: Transmission Convergence layer specifications", 132 pages, Oct. 2010.

Gangxiang Shen et al., "[Topics in Optical Communications] Fixed Mobile Convergence Architectures for Broadband Access: Integration of EPSON and WiMAX", Communications Magazine, IEEE, vol. 45, Issue: 8, Aug. 2007, pp. 44-50 "Hibrid Architecture" (p. 45), "Unified Connection-Oriented Architectures" (pp. 45-46).

International Search Report dated Jan. 28, 2014 corresponding to International Application No. PCT/JP2013/083779; 2 pages.

First Chinese Office Action dated Jul. 25, 2017 from corresponding Chinese Application No. 201380067829.7, 25 pages, machine translation.

Jung et al., "Centralized Scheduling Mechanism for Enhanced End-To-End Delay and QoS Support in Integrated Architecture of EPON and WiMAX", Journal of Lightwave Technology, Aug. 15, 2010, pp. 2277-2288, vol. 28, No. 16.

Ou et al., "Integrated Dynamic Bandwidth Allocation in Converged Passive Optical Networks and IEEE 802.16 Networks", IEEE Systems Journal, Dec. 2010, pp. 467-476, vol. 4, No. 4.

Extended European Search Report dated Aug. 16, 2017 from corresponding European Patent Application No. 17167843.6, 13 pages.

* cited by examiner

OPTICAL-WIRELESS ACCESS SYSTEM

BACKGROUND

1. Field of the Disclosure

The present disclosure relates to transmission of information for dynamic resource allocation and sleep (pause) control in a system in which a cellular system and an optical access system are connected to each other.

2. Discussion of the Background Art

In cellular systems such as LTE (Long Term Evolution)® and WiMAX (Worldwide Interoperability for Microwave Access), a terminal wirelessly communicates with a base station. Usually, since one base station communicates with a plurality of terminals, the base station performs scheduling for dynamically allocating finite communication capacity (resource) to each terminal to prevent interference of signals between the terminals. When uplink communication in the LTE® is taken as an example, a sequence from when a terminal (UE: User Equipment) generates an uplink signal to when the terminal transmits data to a base station (eNB) is as shown in FIG. 1. First, when the UE requests bandwidth from eNB, the eNB obtains information (such as an amount of buffered data and a channel state) required for scheduling of uplink data, therefore the eNB allocates a resource for transmitting those information to the UE, and gives notice to the UE by returning a response. When the UE transmits the information, required for scheduling the uplink data in the allocated resource, to the eNB, the eNB performs scheduling and allocates the resource for transmitting the uplink data to the UE using a scheduling grant. The UE can transmit the uplink data to the eNB only after those exchanges. In the downlink communication, since the number of the base station transmitting a signal is one, such exchanges carried out to avoid interference of signals between a terminal and the base station are not usually performed before communication.

In such a cellular system, as a connection form between a base station and an upper-level device thereof, a point-to-multipoint form utilizing a PON (Passive Optical Network) system can be taken. In this case, as shown in FIG. 2, an upper-level device and an eNB are connected to each other by optical fibers and an optical splitter. According to this constitution, since one upper-level device can accommodate a plurality of base stations, the number of the upper-level devices to the number of the base stations and the number of optical fibers can be reduced, so that economic efficiency is improved. Examples of a signal multiplexing method for a PON include TDM, WDM, and FDM etc.

In the PON, since one OLT (Optical Line Terminal) communicates with a plurality of ONUs (Optical Network Unit), the OLT performs scheduling for dynamically allocating capacity to each of the ONUs. FIG. 3 shows a sequence in which the ONU transmits an uplink signal in a normal PON. The ONU first transmits information (REPORT information) on data amount accumulated in a transmission buffer to an OLT at a timing designated by a transmission permission signal transmitted from the OLT. In Ethernet® PON defined by IEEE 802.3, transmission is performed using a REPORT message. In G-PON (G.984 series) and XG-PON (G.987 series) of ITU-T, transmission is performed using a field defined in a header of an uplink signal frame. The OLT performs scheduling based on the REPORT information to allocate a resource for transmitting uplink data to the ONU, and, thus, to notify the ONU of this. In the Ethernet® PON defined by IEEE 802.3, notification is performed using a GATE message. In the G-PON and the XG-PON of the ITU-T, notification is performed using a field defined in a header of a downlink signal frame. The ONU can transmit uplink data to the OLT only after those exchanges. In the downlink communication, such exchanges before communication between the OLT and the ONU are not particularly carried out.

In a system shown in FIG. 2, the system is in a state in which schedulers of two systems, that is, a cellular and a PON are connected in series in one system, and, for example, a sequence of uplink communication from a UE is as shown in FIG. 4 based on FIGS. 1 and 3. In this case, once uplink data has arrived at the ONU through all sequences of uplink communication of the LTE®, the sequence of uplink communication in the PON starts.

Meanwhile, in a system such as a cellular system and PON, in order to save power consumption of the device, the system may have a function of pausing some devices during a time when communication is not performed on the side where a plurality of devices exist. In each system, a transmitting side usually enters a pause state when there is no transmission data and is recovered from the pause state when transmission data is generated. In a receiving side, since data to be received may exist while the receiving side pauses, the receiving side is often set to recover from the pause state at fixed intervals of time and confirm the existence of the data to be received. As an example thereof, in discontinuous reception of the LTE®, a sequence from a normal receiving state to start of the discontinuous reception and a sequence to termination of the discontinuous reception are shown in FIGS. 5 and 6, respectively. The UE starts the discontinuous reception when there is no traffic if a constant time T1 or more is elapsed from the latest traffic (FIG. 5). When the UE is in an discontinuous reception state, the UE repeats such an operation that some devices relating to reception are paused only for a time T2 and recover from the pause state for a time T3. The UE terminates the discontinuous reception state when uplink traffic occurs or when detecting that a resource for downlink communication is allocated within the time T3 when the UE is in a recover state. In the former case, that is, when the uplink traffic occurs, the discontinuous reception is terminated once the uplink traffic has occurred, and normal uplink communication shown in FIG. 1 starts, and in the latter case as shown in FIG. 6, that is, downlink data is received during a recovery cycle of the time T3. Although a cyclic parameter of the discontinuous reception of T1-T3 is designated by the eNB during connection, there is no particular regulation that the UE notifies the eNB of timing at which the UE enters the discontinuous reception state, and this operation can be performed as autonomous operation on the terminal side.

Meanwhile, a control message and a state transition diagram for realizing sleep of the ONU in the PON are prescribed by ITU-T G.987.3 (see Non Patent Literature 1). Messages such as Sleep Allow (ON) and Sleep Allow (OFF) for which the OLT allows/forbids each of the ONUs to sleep and Sleep Request (Sleep) and Sleep Request (Awake) for which the ONU requires the OLT to sleep/awake are specified. PON sleep based on G.987.3 is different from the discontinuous reception of the LTE® in that the OLT manages a sleep state of the ONU. An example of a procedure until sleep starts and an example of a procedure until the sleep state shifts to an active state are shown in FIGS. 7 and 8, respectively. When the OLT does not detect an uplink/downlink frame addressed to the relevant ONU only for a fixed time T4, the OLT transmits the Sleep Allow (ON) to the ONU, and when the ONU judges that the ONU can shift to the sleep state, the ONU transmits the Sleep Request (Sleep) to the OLT and then enters the sleep state (FIG. 7). The sleep is cyclic as with the discontinuous reception of the LTE®, and the ONU repeats such an operation that the ONU maintains the sleep state only for a time T5 and then recovers only for a time T6. The ONU shifts from the sleep state to the active state when the uplink traffic occurs or when receiving the Sleep Allow (OFF) from the OLT within the time T6. In the former case, that is, when the uplink traffic occurs, the ONU terminates the sleep state, so that normal uplink communication shown in FIG. 3 starts. In the latter case, that is, when the ONU receives the Sleep Allow (OFF) from the OLT within the time T6, as shown in FIG. 8, the ONU receives the Sleep Allow (OFF) in a recovery cycle of the time T6, returns the Sleep Request (Awake), shifts to the active state, and then receives a frame addressed to the ONU itself.

When the LTE® and the PON each have such functions including the discontinuous reception and the sleep as described above, in a system in which they are combined as shown in FIG. 2, each system can pause a portion of a device. In the system as shown in FIG. 2, a sequence to start of the sleep of the PON is shown in FIGS. 9 and 10. FIGS. 9 and 10 show, respectively, a case where the last traffic before the ONU shifts to the discontinuous reception and the sleep state is downlink data and a case where the last traffic is uplink data. For both the cases, while in the LTE® the UE shifts to the discontinuous reception once a time T1 has elapsed from the last traffic, in the PON the OLT transmits the Sleep Allow (ON) to the ONU once the time T4 has elapsed from the last traffic, and the ONU transmits the Sleep Request (Sleep) and then shifts to the sleep state.

The eNB of the LTE® usually holds values of T1-T3 and grasps the start of the discontinuous reception and a cycle of the UE. Similarly, the OLT of the PON manages the sleep state of the ONU and grasps the sleep state and the cycle. Thus, when the down traffic occurs in each independent system, the eNB and the OLT buffer a downlink signal and perform downlink communication with the same timing as the discontinuous reception of the UE and a recovery cycle from the sleep of the ONU, as shown in FIGS. 11 and 12, whereby a frame loss can be avoided. The buffer time is referred to as a "recovery cycle waiting time".

CITATION LIST

Non Patent Literature

[Non Patent Literature 1]
ITU-T Recommendation G.987.3, "10 Gigabit-capable Passive Optical Networks: Transmission Convergence layer specifications"

Three problems that may occur in a system as shown in FIG. 2 in which point-to-multipoint systems using a dynamic scheduler are connected in series are shown in the following examples.

The first example is an example in normal uplink data communication. Although a sequence of uplink data communication is as shown in FIG. 4, when an eNB and an upper-level device are connected to each other through point-to-point optical fiber communication instead of a PON, the sequence of the uplink data communication is as shown in FIG. 13. In comparison to FIG. 13, in FIG. 4, the number of exchanges of signals carried out from when uplink data is generated in a UE till when reaching an upper-level device is larger by a PON scheduler than that in FIG. 13, and consequently an increase in a communication delay time is expected. This may have an adverse effect when a protocol and an application requiring low delay properties are used.

The second example is an example of uplink communication when an ONU of the PON is in the sleep state. A sequence from when uplink data is generated in the UE till when the uplink data reaches an upper-level device of the eNB is shown in FIG. 14. The UE transmits the uplink data to the eNB through a sequence of normal uplink communication of an LTE®, and the eNB delivers the uplink data to the ONU. At this time, when the ONU in the sleep state receives the uplink data from the eNB, the ONU shifts to the active state in the next recovery cycle or immediately starts preparation for shifting to the active state. Although selection of the operation depends on an implementation method, in the latter operation, the ONU shifts to the active state in a shorter time than the former operation, and in both the operations, a waiting time for uplink data is increased by a time till the ONU shifts to the active state. When the ONU is not in the sleep state, an uplink communication sequence is as shown in FIG. 4. In comparison to FIG. 4, in FIG. 14, it is predicted that the communication delay time is increased by a waiting time till when the ONU shifts from the sleep state to the active state. As in the first example, the increase in the communication delay time may have an adverse effect when a protocol and an application requiring the low delay properties are used.

The third example is an example of downlink communication where the UE of the LTE® is in the discontinuous reception state, and the ONUs of the PON are each in the sleep state. A sequence from when an upper-level device transmits downlink data till when the UE receives the downlink data is shown in FIG. 15. In the PON system, the downlink data is buffered by OLT resulting from waiting for a sleep recovery cycle of the ONU and is then buffered again by the eNB resulting from waiting for an discontinuous reception recovery cycle of the UE in an LTE® system. Consequently, the capacity of a memory to be provided in the entire system is increased, leading to increases in cost and power consumption.

As described above, in the system as shown in FIG. 2 in which the cellular and the PON are connected in series, when dynamic scheduling and pause control in the cellular and the PON are independently operated, a communication delay time is increased in the entire system, or power consumption and cost are increased.

An object of the present disclosure is to prevent, in an optical-wireless access system in which a cellular and a PON are connected in series, increases in a communication delay time, cost, and power consumption resulting from dynamic scheduling and pause control in the cellular and the PON.

SUMMARY

An optical-wireless access system of the present disclosure is an optical-wireless access system in which one or more base stations communicating with a wireless terminal are connected to an upper-level device via an optical access system, the optical access system includes one or more optical network units (ONUs) arranged on the base station side, an optical line terminal (OLT) disposed on the upper-level device side, and optical transmission paths through which the ONU and the OLT are connected, and the ONU obtains information on dynamic scheduling control or discontinuous reception control of the optical-wireless access system from the base station.

A base station of the present disclosure is provided in an optical-wireless access system in which one or more base stations communicating with a wireless terminal are connected to an upper-level device via an optical access system, the optical access system includes one or more optical network units (ONUs) arranged on the base station side, an optical line terminal (OLT) disposed on the upper-level device side, and optical transmission paths through which the ONUs and the OLT are connected, and the ONU obtains information on dynamic scheduling control or discontinuous reception control of the optical-wireless access system from the base station.

A method of operating an optical-wireless access system according to the present disclosure is a method of operating an optical-wireless access system in which one or more base stations communicating with a wireless terminal are connected to an upper-level device via an optical access system, the optical access system includes one or more optical network units (ONUs) arranged on the base station side, an optical line terminal (OLT) disposed on the upper-level device side, and optical transmission paths through which the ONUs and the OLT are connected, and the ONU obtains information on dynamic scheduling control or discontinuous reception control of the optical-wireless access system from the base station.

An OLT of the present disclosure is an OLT in an optical-wireless access system in which one or more base stations communicating with a wireless terminal are connected to an upper-level device via an optical access system and which includes one or more optical network units (ONUs) arranged on the base station side, an optical line terminal (OLT) disposed on the upper-level device side, and an optical transmission path through which the ONU and the OLT are connected, and information on dynamic scheduling control or discontinuous reception control of the optical-wireless access system is obtained from the ONU.

An OLT of the present disclosure may receive the information on the discontinuous reception of the wireless terminal, received by the ONU from the wireless terminal, from the ONU.

An OLT of the present disclosure may determine whether or not the ONU should be slept, using the information on the discontinuous reception of the wireless terminal and, at the same time, may calculate a sleep start timing and a cycle of the ONU that minimizes the waiting time in the base station of downlink data of the wireless terminal.

An upper-level device of the present disclosure has the OLT or a function as the relevant OLT according to the present disclosure and is a device integrated with the OLT or the function as the relevant OLT.

An ONU of the present disclosure is an ONU in an optical-wireless access system in which one or more base stations communicating with a wireless terminal are connected to an upper-level device via an optical access system and which includes one or more optical network units (ONUs) arranged on the base station side, an optical line terminal (OLT) disposed on the upper-level device side, and optical transmission paths through which the ONU and the OLT are connected, and information on dynamic scheduling control or discontinuous reception control of the optical-wireless access system is obtained from the base station.

In the present disclosure, the ONU may obtain the information on the dynamic scheduling control or the discontinuous reception control of the optical-wireless access system, using a line which is physically different from a line through which normal uplink data is transmitted.

In the present disclosure, the ONU may obtain the information on the dynamic scheduling control or the discontinuous reception control of the optical-wireless access system, using control protocol(s) in layer 2 or above.

An ONU of the present disclosure receives grant information transmitted from the base station to the wireless terminal and may start a sequence of transmitting uplink data to the OLT in the wake of the reception of the grant information.

An ONU of the present disclosure may include a buffer state prediction part which predicts a frame amount in a buffer of uplink data transmitted to the OLT based on the grant information transmitted from the base station to, the wireless terminal, and a REPORT generation part which generates a REPORT message based on an amount of buffered data notified from the buffer state prediction part.

An ONU of the present disclosure receives the grant information transmitted from the base station to the wireless terminal once the base station has determined the grant information and may start to shift from the sleep state to the active state in the wake of the reception of the grant information.

An ONU of the present disclosure may include a sleep/awake determination part which receives grant information transmitted from the base station to the wireless terminal and, in the wake of the reception of the grant information, starts operation of shifting the ONU to the active state.

In an ONU of the present disclosure, the discontinuous reception information received from the base station may be transferred to the OLT.

A base station of the present disclosure has the ONU or the function as the relevant ONU according to the present disclosure and is a device integrated with the ONU or the function as the relevant ONU.

An optical-wireless access system of the present disclosure includes an upper-level device integrated with the OLT according to this disclosure and a base station integrated with the ONU according to this disclosure.

The above disclosures can be combined with each other as possible.

Advantageous Effects of Disclosure

According to the present disclosure, in an optical-wireless access system in which a cellular and a PON are connected in series, it is possible to prevent increases in a communication delay time, power consumption, and cost resulting from dynamic scheduling and pause control in the cellular and the PON.

DETAILED DESCRIPTION OF THE PREFERRED EMBODIMENT

Figure 1:
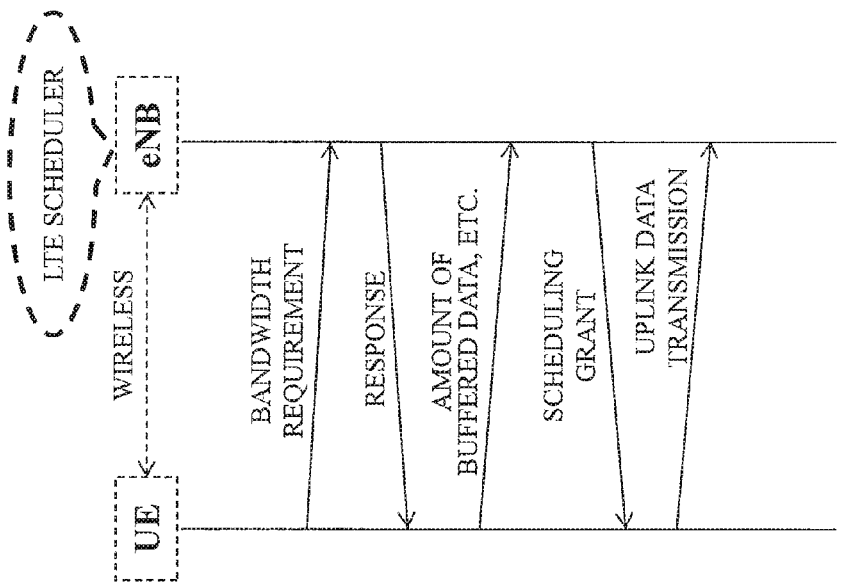
FIG. 1 is an example of an uplink communication sequence in an LTE®.
Figure 2:
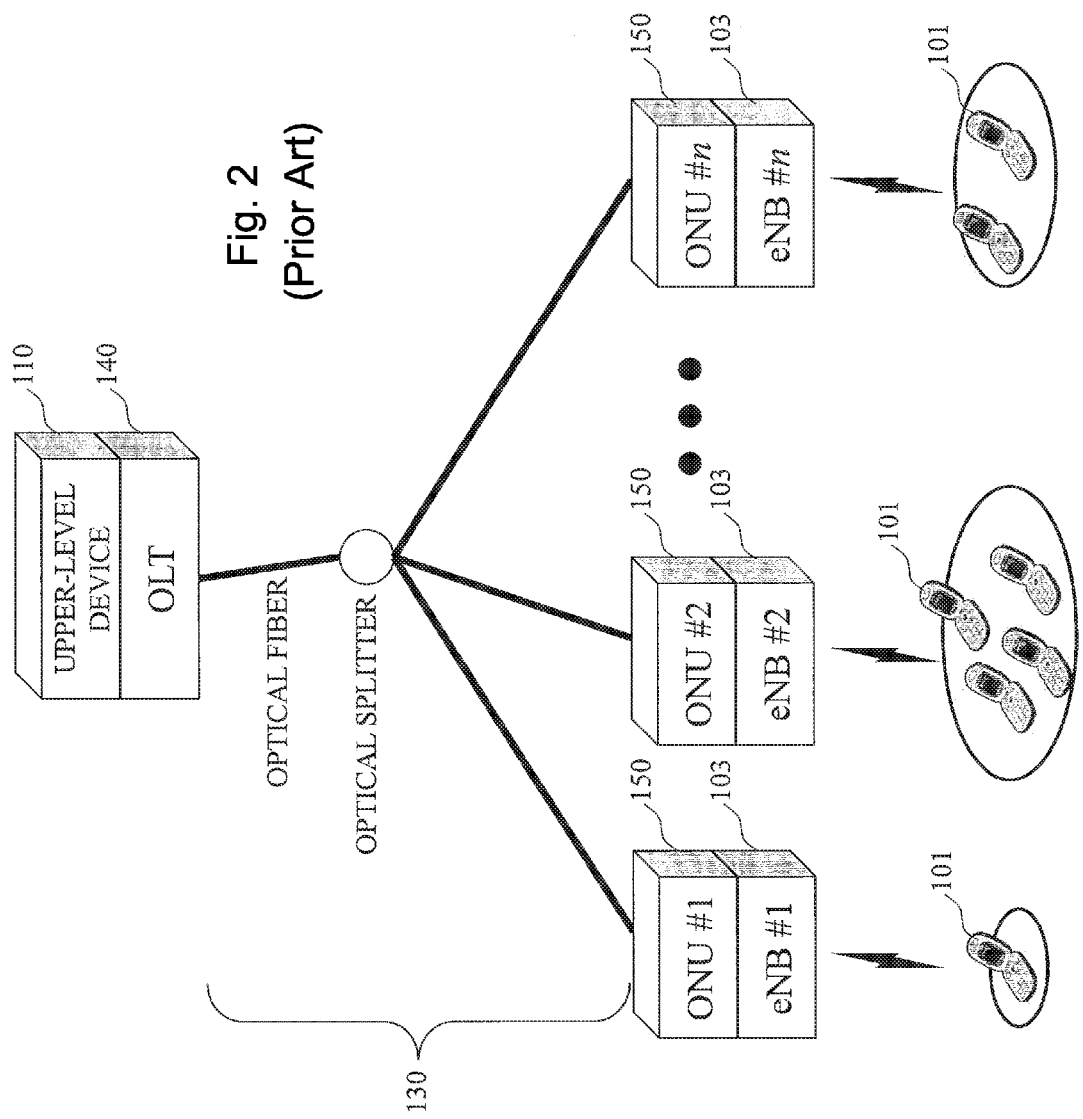
FIG. 2 is an example of an optical-wireless access system in which a cellular system and a PON are connected in series.
Figure 3:
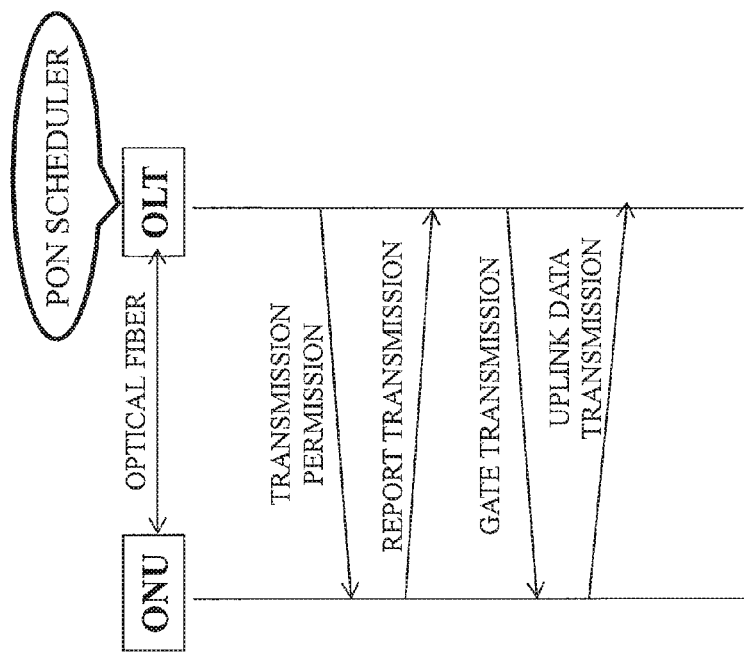
FIG. 3 is an example of an uplink communication sequence in the PON.

Embodiments of the present disclosure will be described with reference to the accompanying drawings. The embodiments to be described hereinafter are examples of the present disclosure, and the present disclosure is not limited to the following embodiments. Those embodiments are merely examples and can be practiced in forms variously modified and improved based on the knowledge of those skilled in the art. Components denoted by the same reference numerals in the present specification and the drawings mutually denote the same components.

In an optical-wireless access system of the present disclosure, one or more base stations are connected to an upper-level device through an optical access system. An optical access system includes one or more optical network units (ONUs) arranged on the base station side, an optical line terminal (OLT) disposed on the upper-level device side, and optical transmission paths through which the ONU and the OLT are connected. The optical transmission paths include optical components such as optical fibers and a coupler. In the optical-wireless access system of this disclosure and a method of operating the optical-wireless access system, the ONU obtains, from the base station, information on dynamic scheduling control of the optical-wireless access system, information on discontinuous reception control of the optical-wireless access system, or both of these information. Those information is used in the ONU or transferred to the OLT and used as parameters for scheduling or sleep control in a PON.

Embodiment 1

Figure 4:
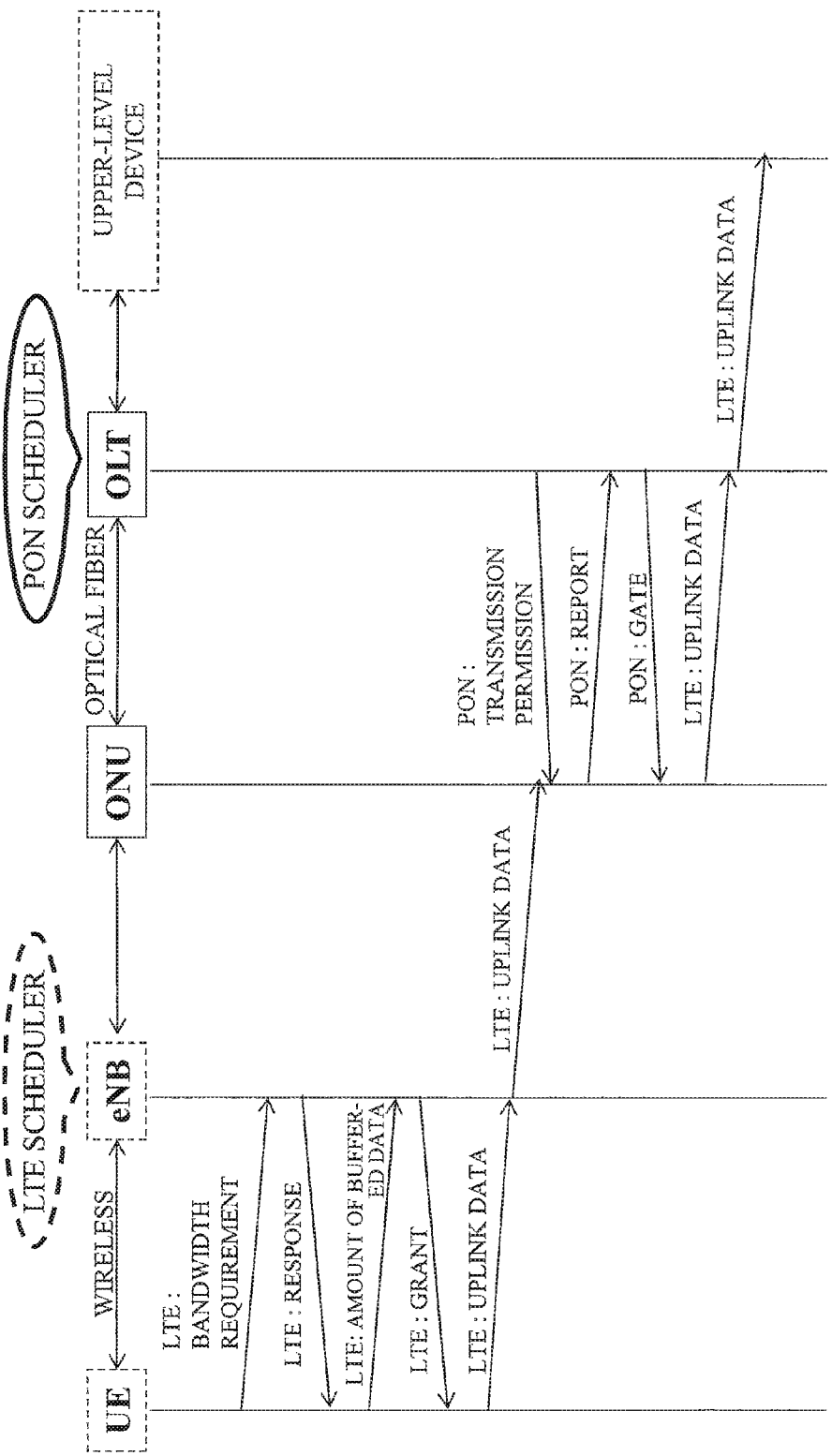
FIG. 4 is an example of an uplink communication sequence in an optical-wireless access system.
Figure 5:
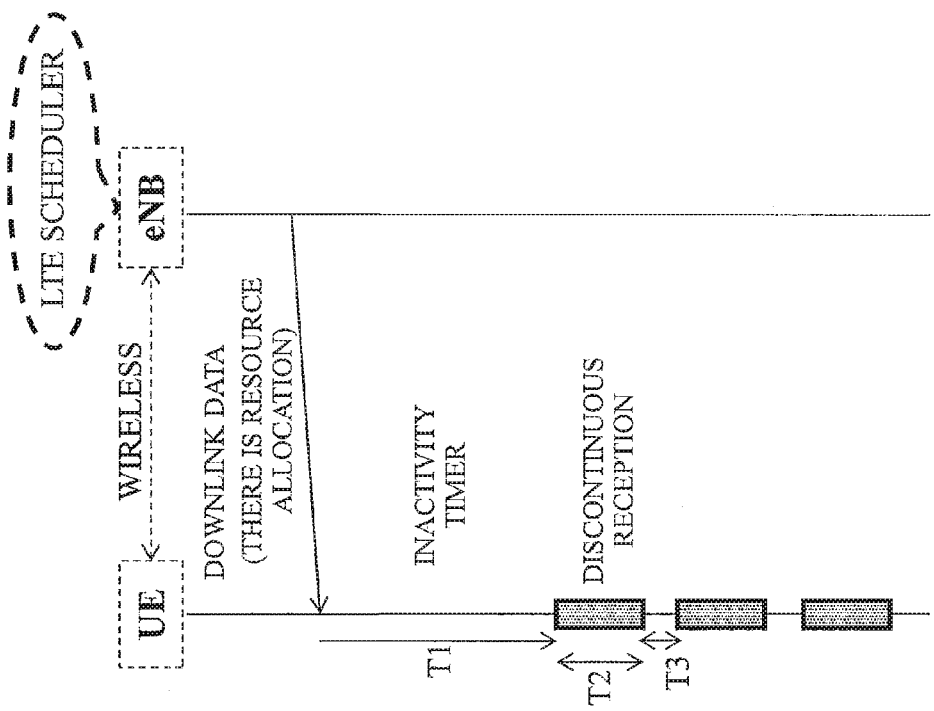
FIG. 5 is an example of a start sequence of discontinuous reception in the LTE®.
Figure 6:
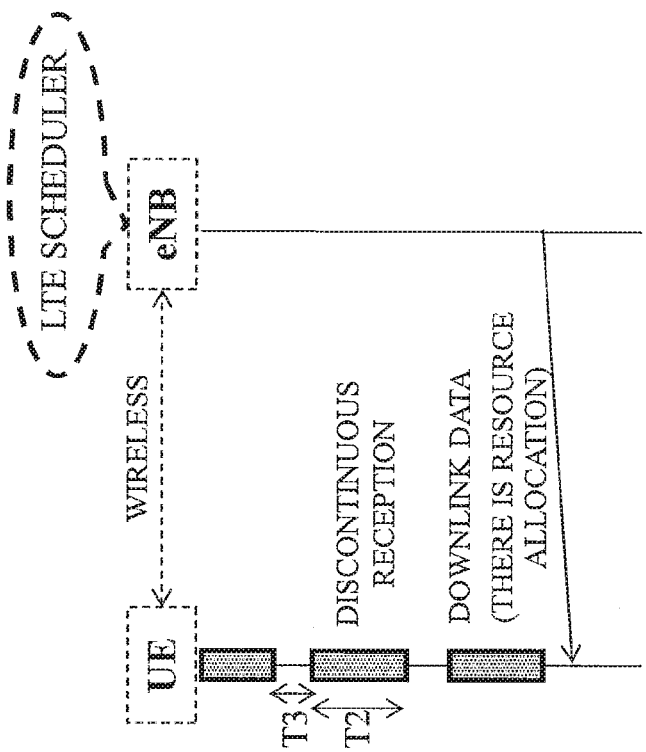
FIG. 6 is an example of a termination sequence of the discontinuous reception in the LTE®.
Figure 16:
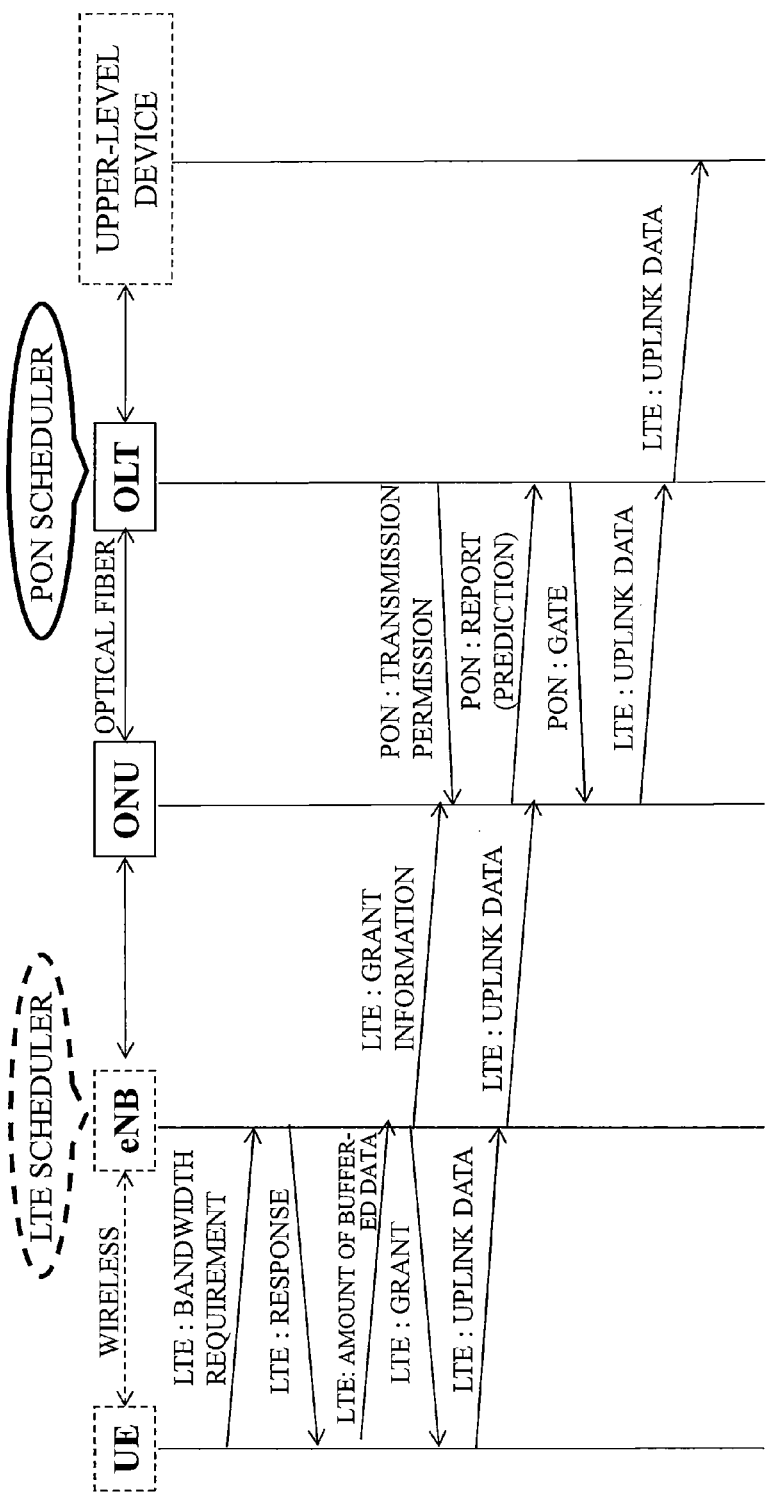
FIG. 16 is an example of an uplink communication sequence in an optical-wireless access system according to Embodiment 1.

To solve the first problem, a sequence of uplink data communication in a system applying a development technology is shown in FIG. 16. FIG. 16 is different from FIG. 4 to which the development technique is not applied, and namely, while in FIG. 4 the sequence of uplink data communication in a PON starts after uplink data has arrived at an ONU, in FIG. 16 once an eNB has determined grant information, the grant information is delivered to not only a UE but also the ONU, and the sequence of uplink communication in a PON starts once the ONU has received the grant information. The ONU predicts an amount of buffered data based on the grant information to generate a REPORT signal, and, thus, to transmit the REPORT signal to an OLT. In comparison to FIG. 4, in FIG. 16 the starting time of the sequence of uplink communication in the PON is earlier, so that a delay time for uplink data to arrive at an upper-level device is reduced.

Figure 17:
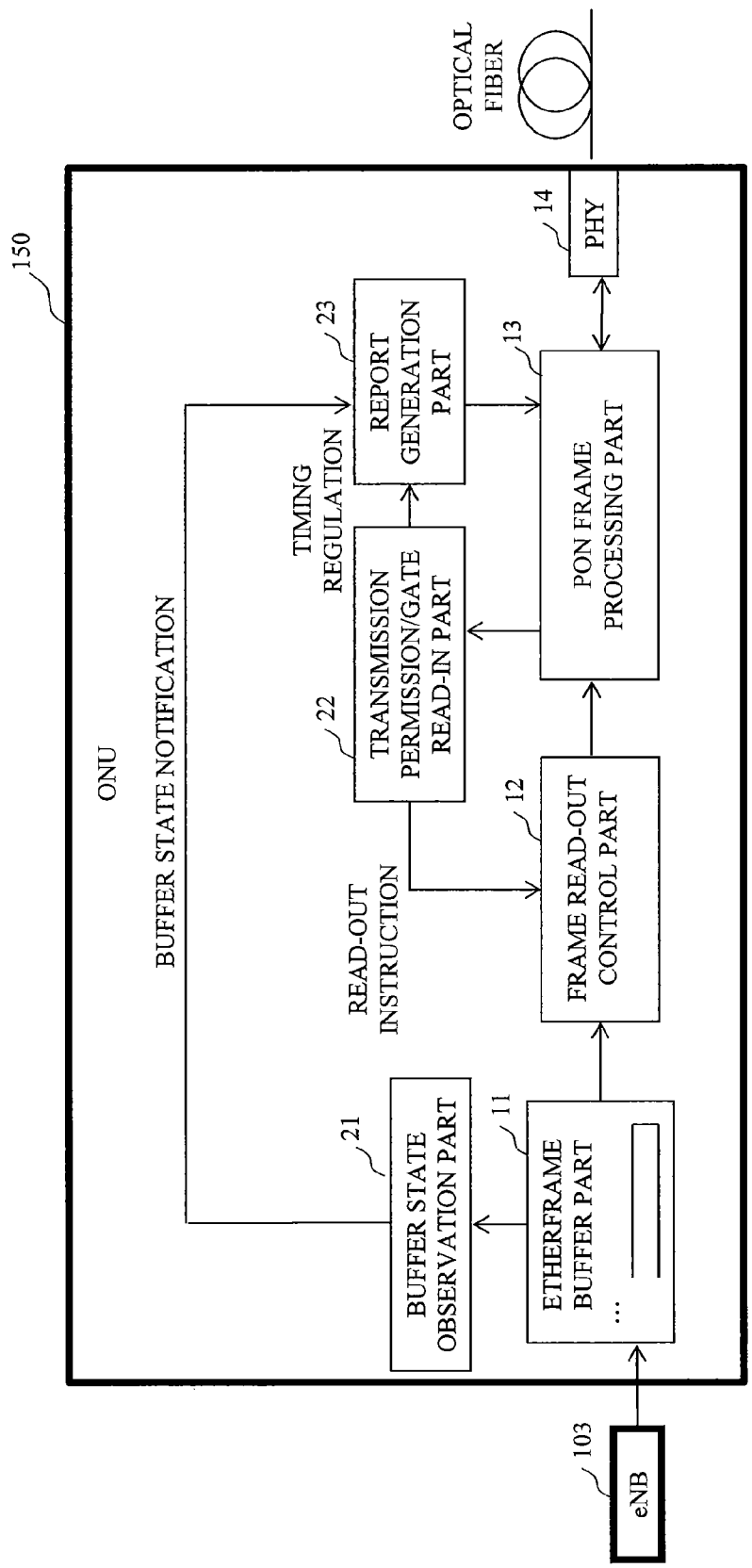
FIG. 17 is an example of an ONU related to the present disclosure in Embodiment 1.

FIG. 17 shows an example of a functional block diagram of an ONU for realizing an uplink communication dynamic scheduling function of a PON. A portion irrelevant to uplink communication dynamic scheduling is omitted. Uplink data from a lower-level device (an eNB 103) of the PON is transmitted to an Etherframe buffer part 11, and a buffer state observation part 21 reads a frame amount in the Etherframe buffer part 11 and notifies a REPORT generation part 23 of the frame amount. The REPORT generation part 23 generates a REPORT message based on the notified frame amount in the buffer. A frame in the Etherframe buffer part 11 is read out by a frame read-out control part 12 to become a PON frame in a PON frame processing part, and, thus, to be transmitted from a PHY 14. The REPORT message and the frame are transmitted after their timings are regulated by a transmission permission/GATE read-in part 22 in accordance with a transmission permission/GATE message received from an OLT.

Figure 18:
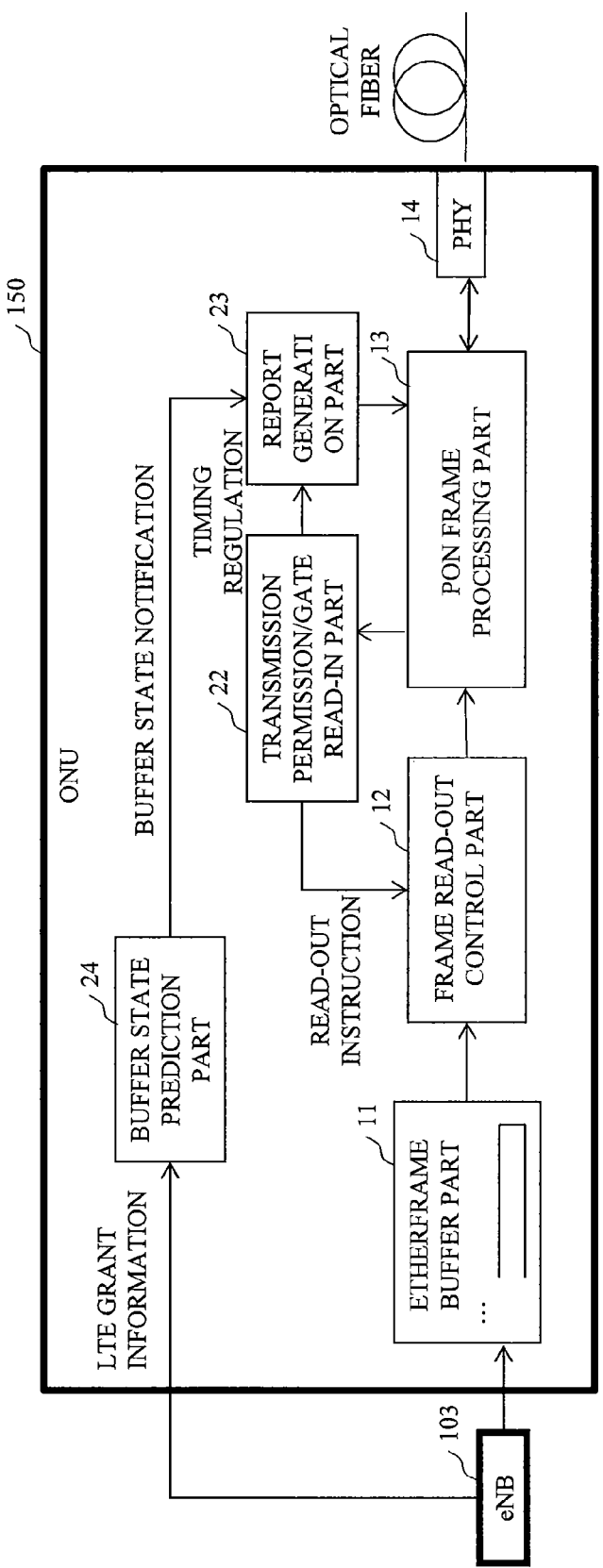
FIG. 18 is an example of the ONU according to Embodiment 1.

FIG. 18 shows a functional block relating to scheduling operation in the case where a development technology is applied, with respect to an ONU 150 of FIG. 17 realizing the uplink communication dynamic scheduling operation as described above. The ONU 150 according to the present embodiment includes a buffer state prediction part 24. The important point for the realization of the methods of FIG. 16 is that the frame amount in the buffer that is predicted based on an LTE® grant information received from the eNB 103 is used in the generation of REPORT. However, an actual buffer state is observed, and its information may be used for the prediction of the frame amount in the buffer and other purposes. Hereinafter, the details will be described.

First, uplink data and the LTE® grant information are both transmitted from the eNB 103 to the ONU. The buffer state prediction part 24 receives this information and then predicts the frame amount in the buffer after a lapse of a certain time. The REPORT generation part 23 generates the REPORT message based on the frame amount in the buffer notified from the buffer state prediction part 24. When usual scheduling for uplink communication is performed using the REPORT, once the grant information has been determined, the ONU 150 can start the sequence of uplink communication without waiting for the frame from the eNB 103, so that a communication delay time for the uplink data to arrive to an upper-level device can be reduced.

As described above, in the disclosure according to Embodiment 1, in the uplink communication, the uplink scheduling in the PON can be started earlier, so that the communication delay time from the UE to the upper-level device can be reduced.

Embodiment 2

Figure 14:
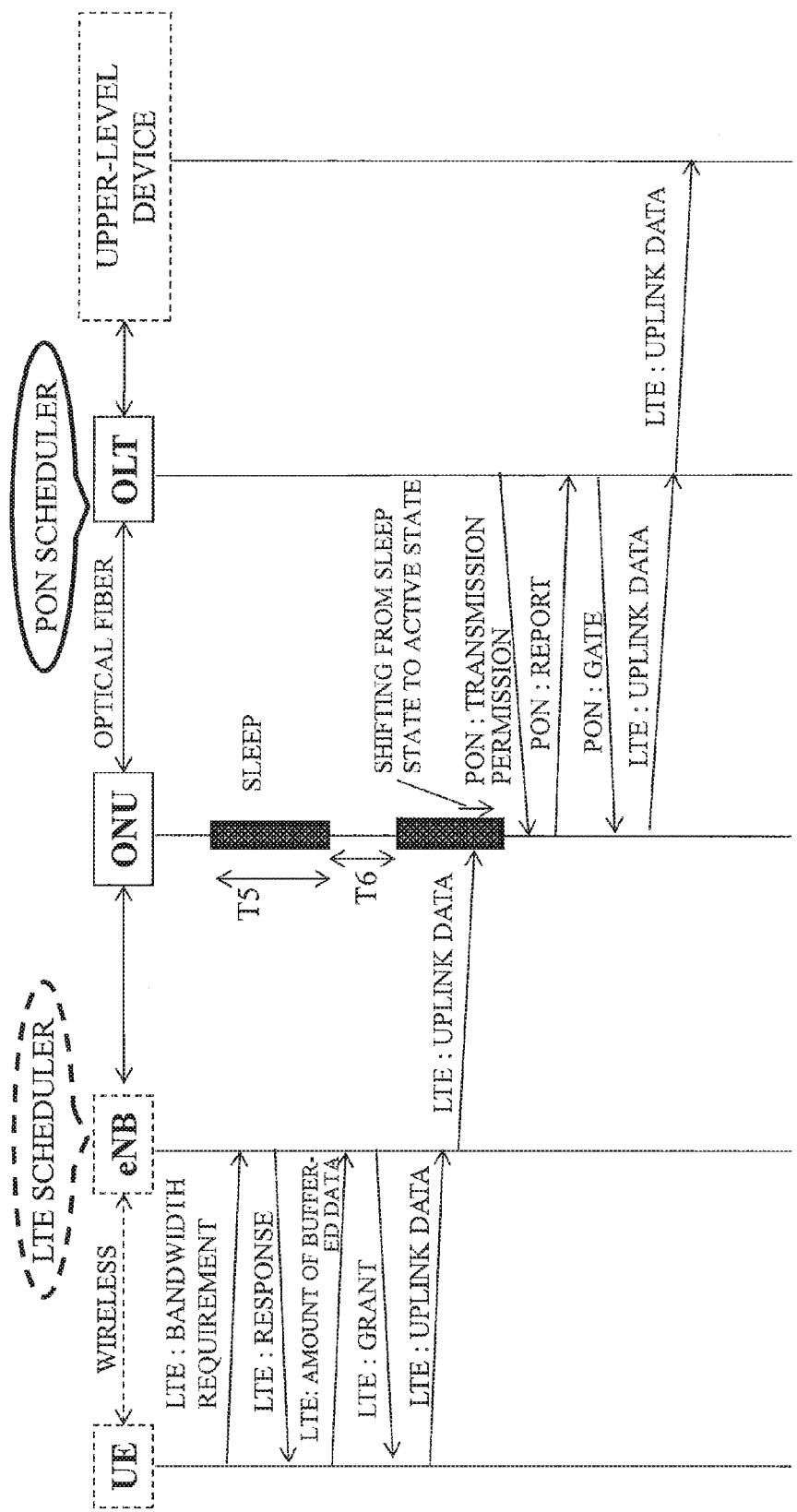
FIG. 14 is an example of an uplink communication sequence when an ONU of the PON is in a sleep state in an associated optical-wireless access system.
Figure 19:
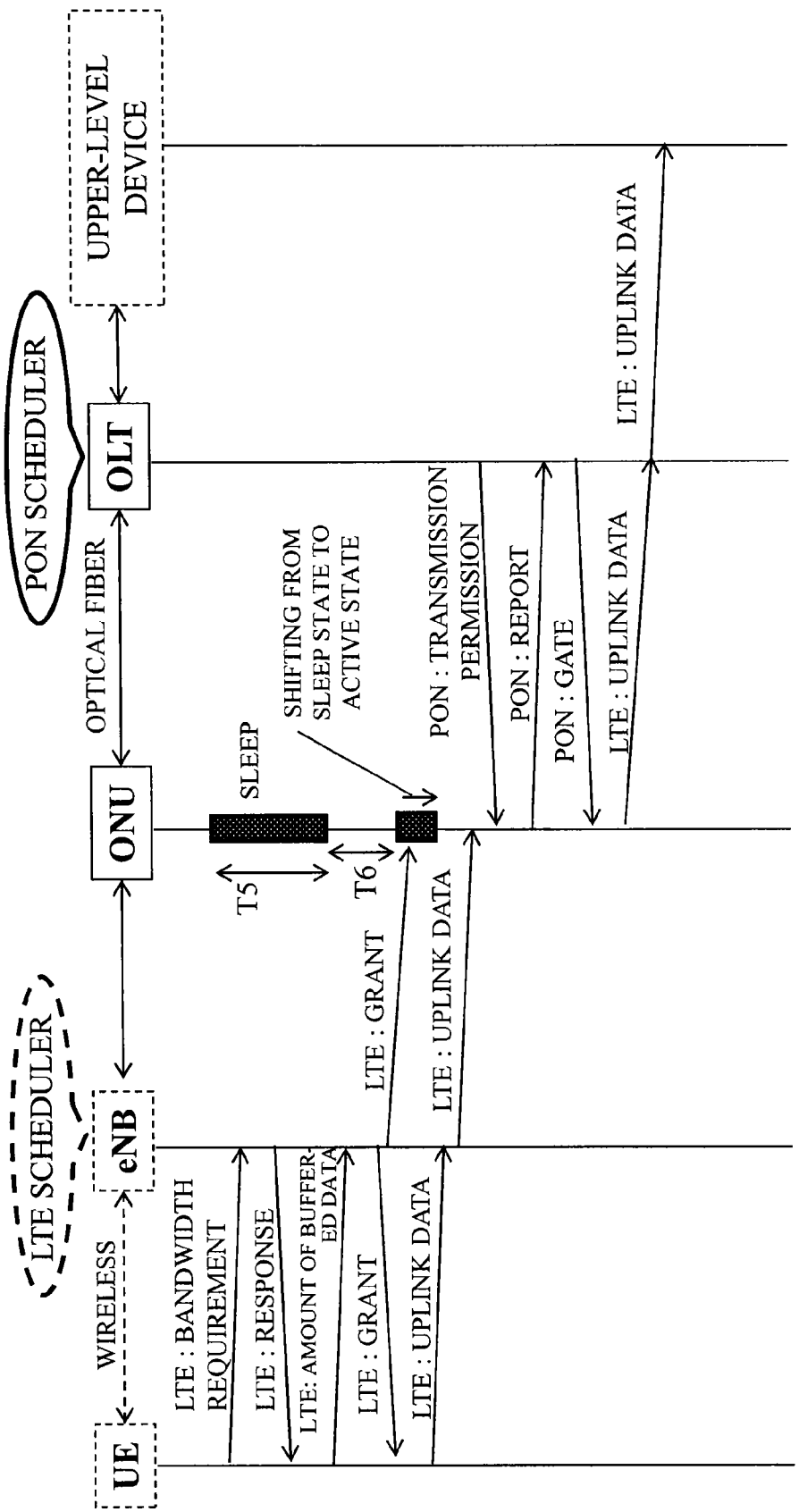
FIG. 19 is an example of an uplink communication sequence in an optical-wireless access system according to Embodiment 2.

To solve the second problem, in a system applying a development technology, a sequence of uplink data communication in which an ONU of a PON is in a sleep state is shown in FIG. 19. FIG. 19 is different from FIG. 14 to which the development technique is not applied, namely, while in FIG. 14 the ONU starts to shift from the sleep state to an active state after uplink data has arrived at the ONU, in FIG. 19 once an eNB has determined grant information, the eNB delivers the grant information to not only a UE but also the ONU, and once the ONU has received the grant information, the ONU starts to shift from the sleep state to the active state. Once the uplink data has actually arrived at the ONU, the ONU is already in the active state, or if the ONU does not shift to the active state, the waiting time of the uplink data should be shorter than that in FIG. 14. For both the cases, in comparison to FIG. 14, in FIG. 19 the starting time for the ONU to shift from the sleep state to the active state in the PON is earlier, so that a delay time for the uplink data to arrive at the upper-level device is reduced.

Figure 20:
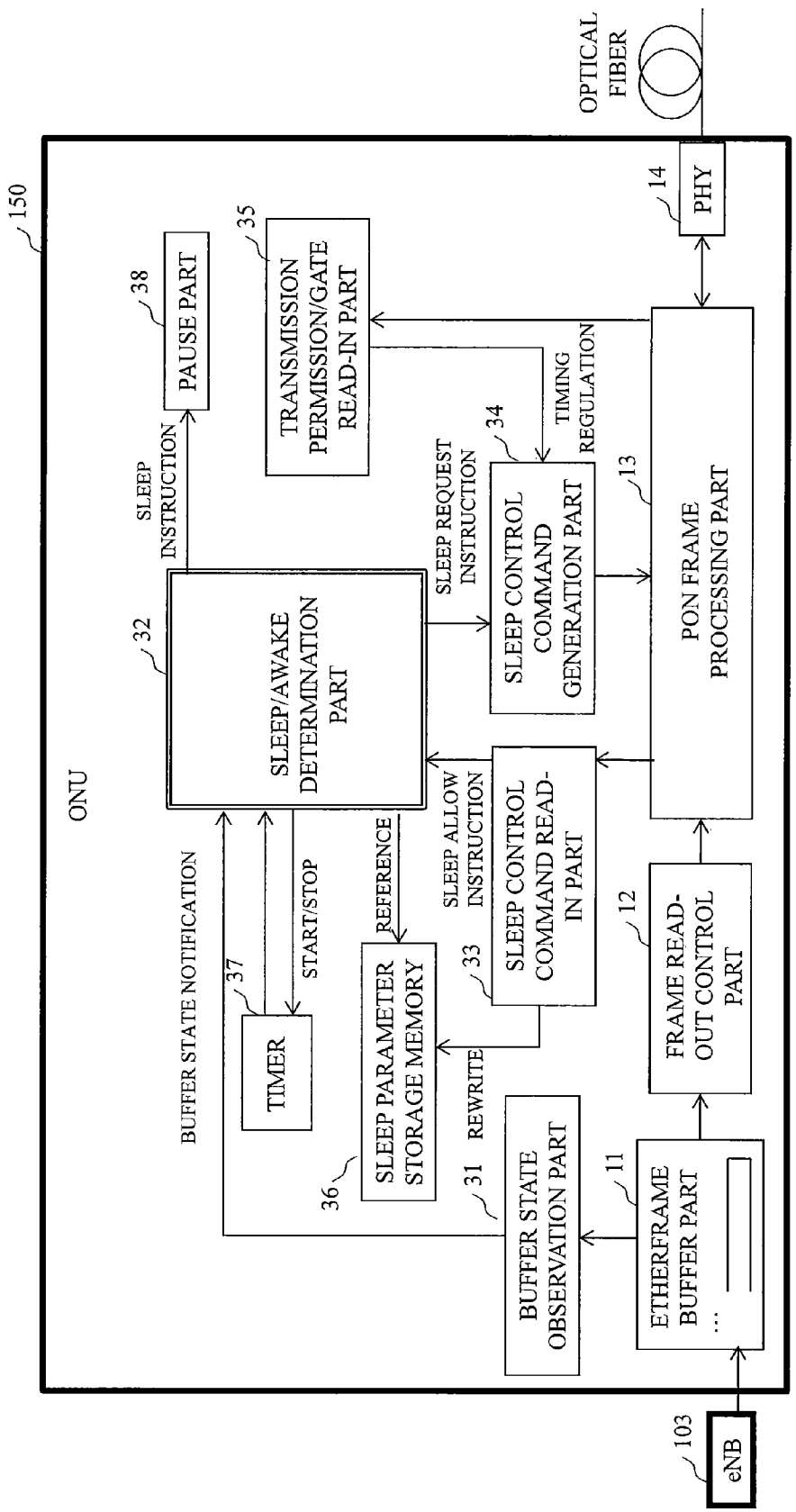
FIG. 20 is an example of an ONU related to this disclosure in Embodiment 2.

FIG. 20 shows an example of a functional block diagram of the ONU for realizing a sleep control function of the PON. An ONU 150 includes a buffer state observation part 31, a sleep/awake determination part 32, a sleep control command read-in part 33, a sleep control command generation part 34, a transmission permission/GATE read-in part 35, a sleep parameter storage memory 36, a timer 37, and a pause part 38. A portion irrelevant to sleep control is omitted.

The ONU in the active state shifts to the sleep state when receiving Sleep Allow (ON) from an OLT. A Sleep Allow (ON) message passes through the sleep control command read-in part 33 and sends an instruction to the sleep/awake determination part 32. The sleep/awake determination part 32 which has received the Sleep Allow (ON) judges whether shifting to the sleep state is performed using as a parameter an Etherframe amount in an Etherframe buffer part 11 notified from the buffer state observation part 31. When the sleep/awake determination part 32 judges that shifting to the sleep state is performed, the sleep/awake determination part 32 sends an instruction to the sleep control command generation part 34 to generate a Sleep Request (sleep). The timing of the Sleep Request (Sleep) is regulated by the transmission permission/GATE read-in part 35, and the Sleep Request (Sleep) is transmitted to the OLT. After that, the sleep/awake determination part 32 shifts the pause part 38 to the sleep state. In FIG. 20, although the pause part 38 in the drawing is illustrated independent from other functional parts as a matter of convenience, the pause part 38 actually includes a part which causes no problem even when being paused (for example, a PHY 14 in FIG. 20) among other functional parts.

The sleep parameter storage memory 36 stores parameters such as a sleep time and a recovery cycle. The sleep start/determination part 32 refers to the parameter in the sleep parameter storage memory 36 and repeats an operation of maintaining the sleep state only for a time T5 using the timer 37 and then recovers only for a time T6. A sleep parameter in the memory 36 is rewritten through a message from the OLT according to need.

The ONU 150 in the sleep state shifts to the active state in the following two cases.

In the first case, the ONU 150 in a recovery cycle from the sleep state shifts to the active state when receiving Sleep Allow (OFF) from the OLT. The Sleep Allow (OFF) is sent to the sleep/awake determination part 32 through the sleep control command read-in part 33. The sleep/awake determination part 32 which has received the Sleep Allow (OFF) sends an instruction to the sleep control command generation part 34 to generate Sleep Request (Awake). After timing of the Sleep Request (Awake) is regulated by the transmission permission/GATE read-in part 35, the Sleep Request (Awake) is transmitted to the OLT. After that, the sleep/awake determination part 32 shifts the pause part 38 to the active state, and normal downlink communication starts.

In the second case, the ONU 150 shifts to the active state when an Etherframe arrives at the Etherframe buffer part 11. If the frame arrives at the Etherframe buffer part 11 from an eNB 103 when the ONU 150 is in the sleep state, the buffer state observation part 31 notifies the sleep/awake determination part 32 of the arrival of the frame. The sleep/awake determination part 32 sends an instruction to the sleep control command generation part 34 to generate the Sleep Request (Awake). After the timing of the Sleep Request (Awake) is regulated by the transmission permission/GATE read-in part 35, the Sleep Request (Awake) is transmitted to the OLT. After that, the sleep/awake determination part 32 shifts the pause part 38 to the active state, and normal uplink communication scheduling operation starts.

Figure 21:
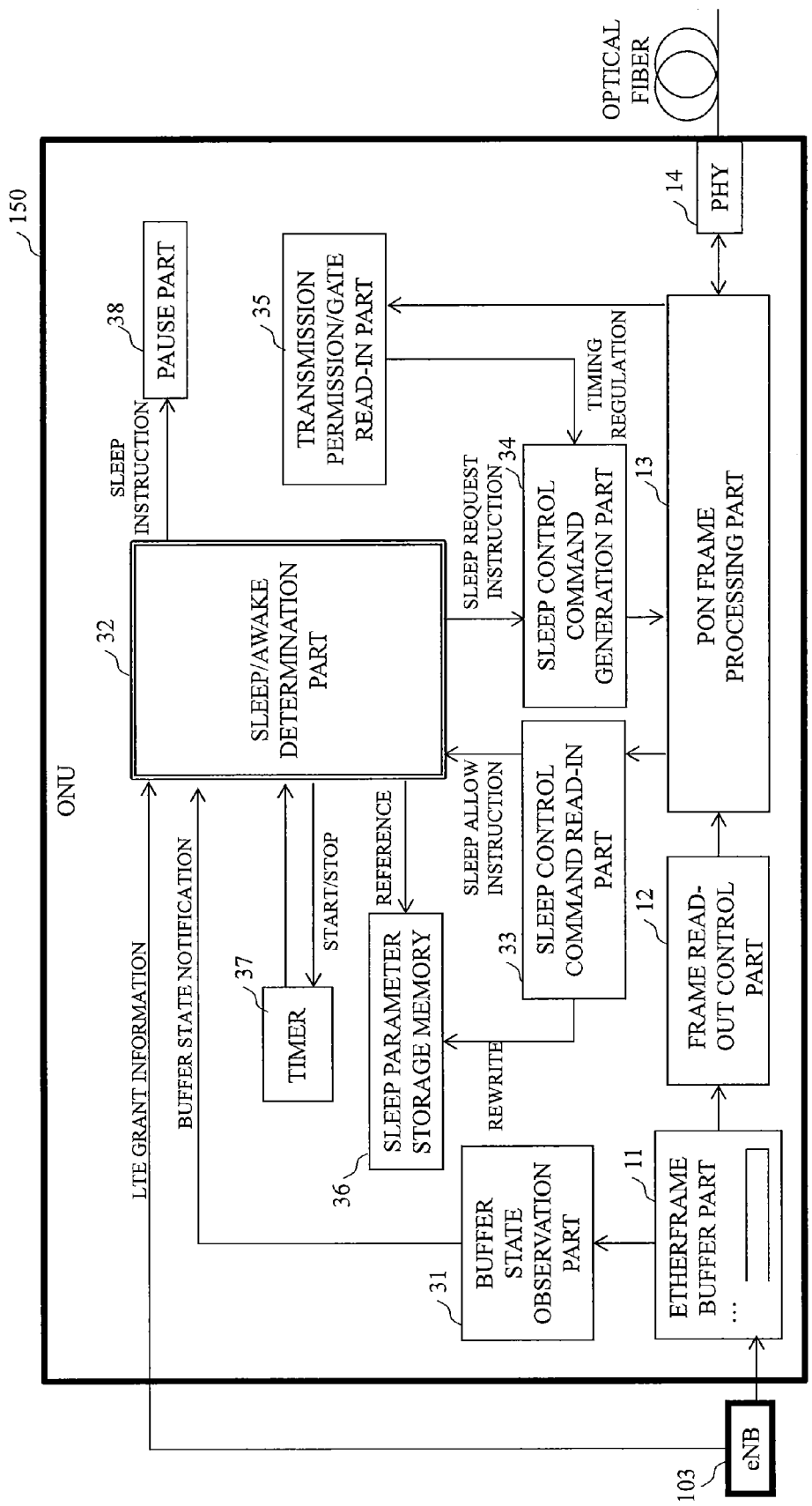
FIG. 21 is an example of the ONU according to Embodiment 2.

FIG. 21 shows a functional block relating to the sleep control in the case where a development technology is applied, with respect to an ONU of FIG. 20 realizing the sleep control as described above. The important point for the realization of the methods of FIG. 19 is that when the ONU 150 in the sleep state shifts to the active state, the sleep/awake determination part 32 starts operation of shifting the ONU 150 to the active state based on not a frame arrival notification from the buffer state observation part 31 but LTE® grant information (or a predetermined signal generated based on the grant information) received from the eNB 103. Hereinafter, the details will be described.

First, uplink data and the LTE® grant information are both transmitted from the eNB 103 to the ONU 150. The sleep/awake determination part 32 which has received this information sends an instruction to the sleep control command generation part 34 to generate the Sleep Request (Awake). After the timing of the Sleep Request (Awake) is regulated by the transmission permission/GATE read-in part 35, the Sleep Request (Awake) is transmitted to the OLT. At this time, the sleep/awake determination part 32 shifts the pause part 38 to the active state and starts normal uplink communication scheduling.

The timing of the transmission of the Sleep Request (Awake) and the shifting to the active state is as early as possible when the subsequent GATE of the PON comes later than uplink data of the LTE®, and meanwhile, when the uplink data of the LTE® comes later, the timing may be slightly delayed so that the GATE of the PON is in time for the timing.

According to the above operations, once the ONU 150 has received the LTE® grant information (or a predetermined signal generated based on the grant information), the ONU 150 can start to shift to the active state without waiting for an uplink frame from the eNB 103, and the delay time for the uplink data to arrive to the upper-level device is reduced.

In Embodiment 2, in the uplink communication in which the ONU is in the sleep state, the shifting of the ONU from the sleep state to the active state can be started earlier, so that a communication delay time from the UE to the upper-level device can be reduced.

Embodiment 3

Figure 9:
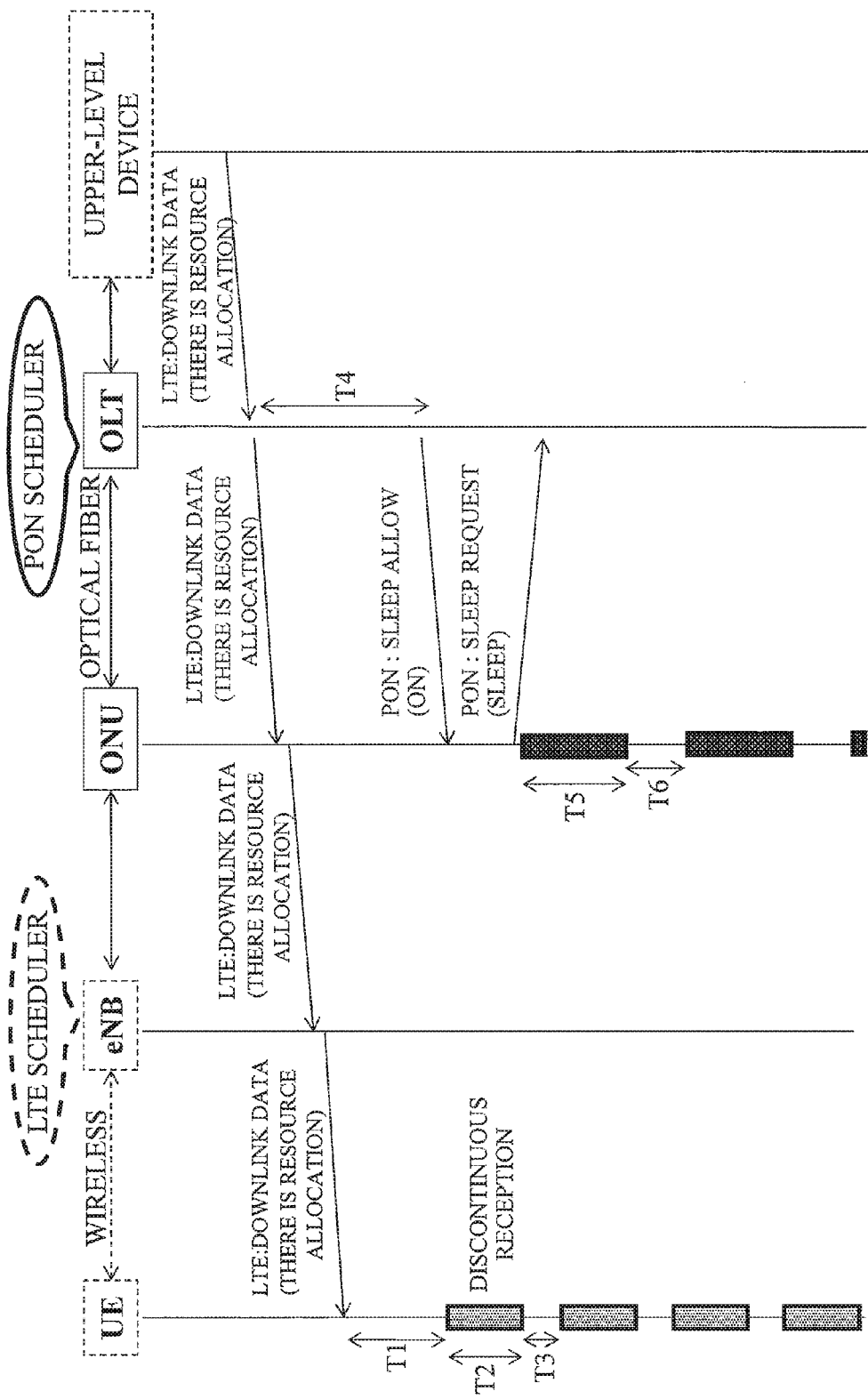
FIG. 9 is a first example of a start sequence of sleep in an associated optical-wireless access system.
Figure 10:
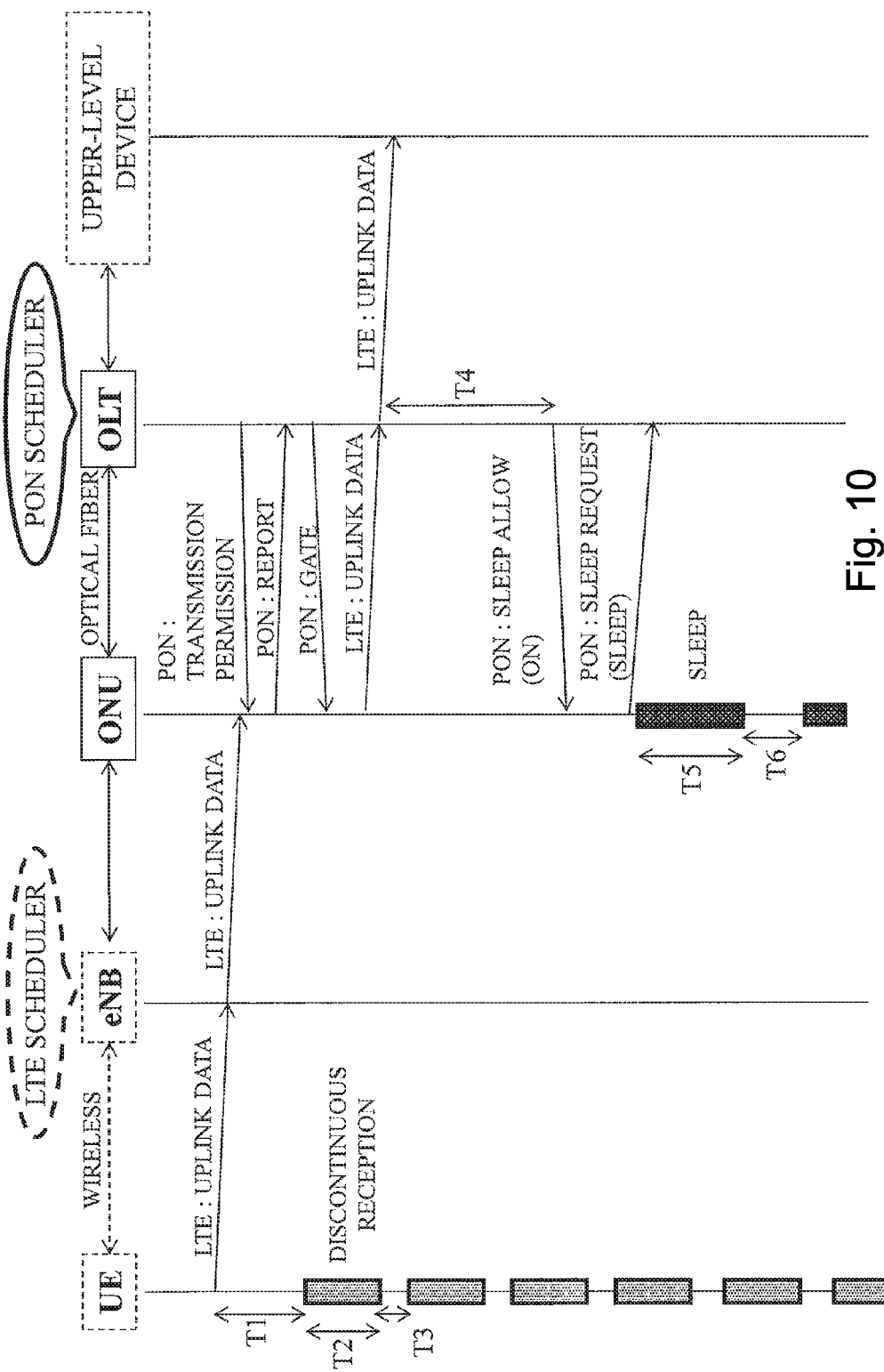
FIG. 10 is a second example of a start sequence of sleep in the associated optical-wireless access system.
Figure 11:
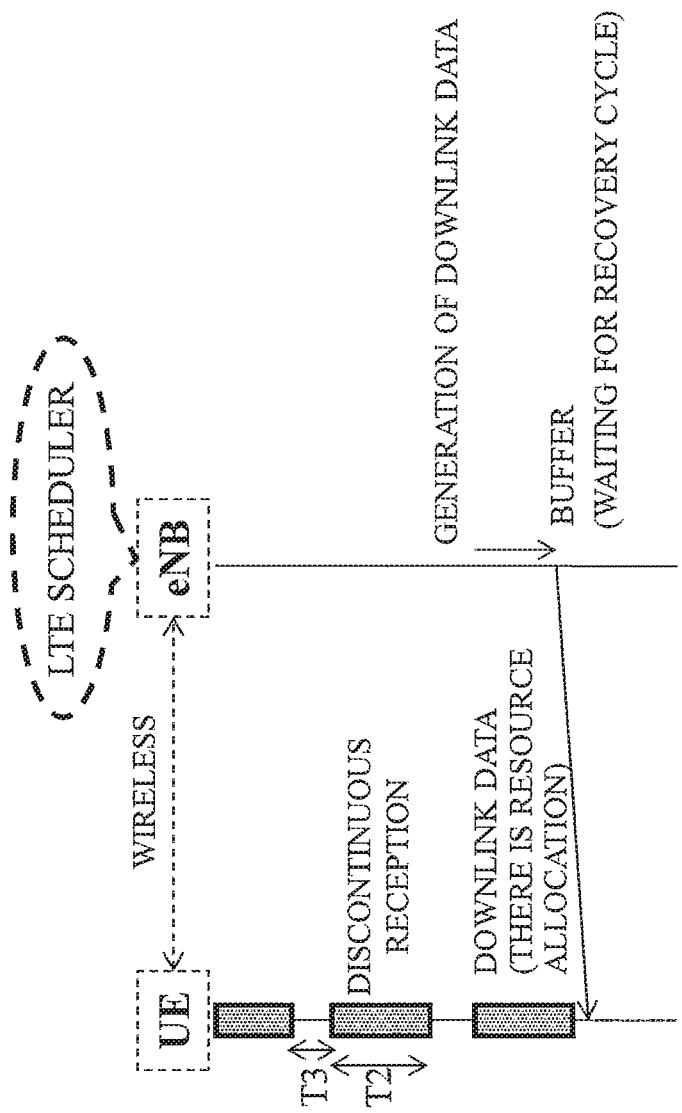
FIG. 11 is a view showing a case where downlink data is generated in the discontinuous reception in the LTE®.
Figure 12:
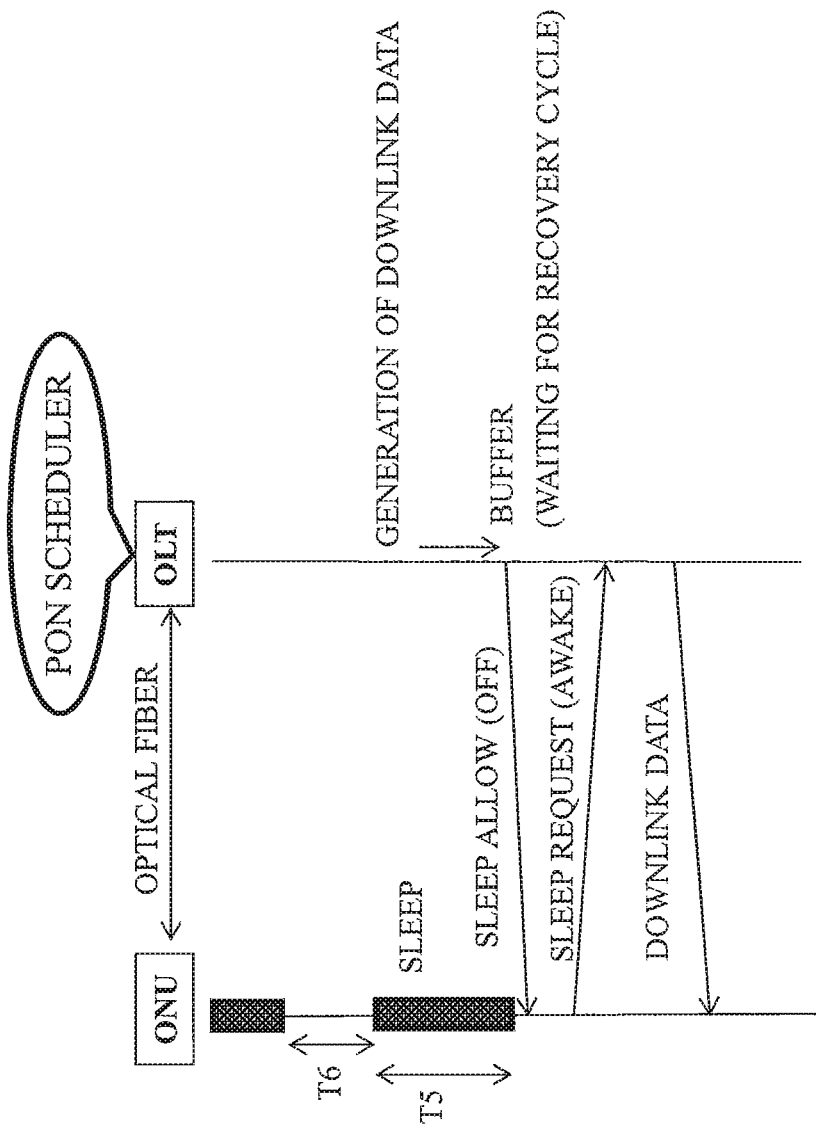
FIG. 12 is a view showing a case where the downlink data is generated during sleep in the PON.
Figure 13:
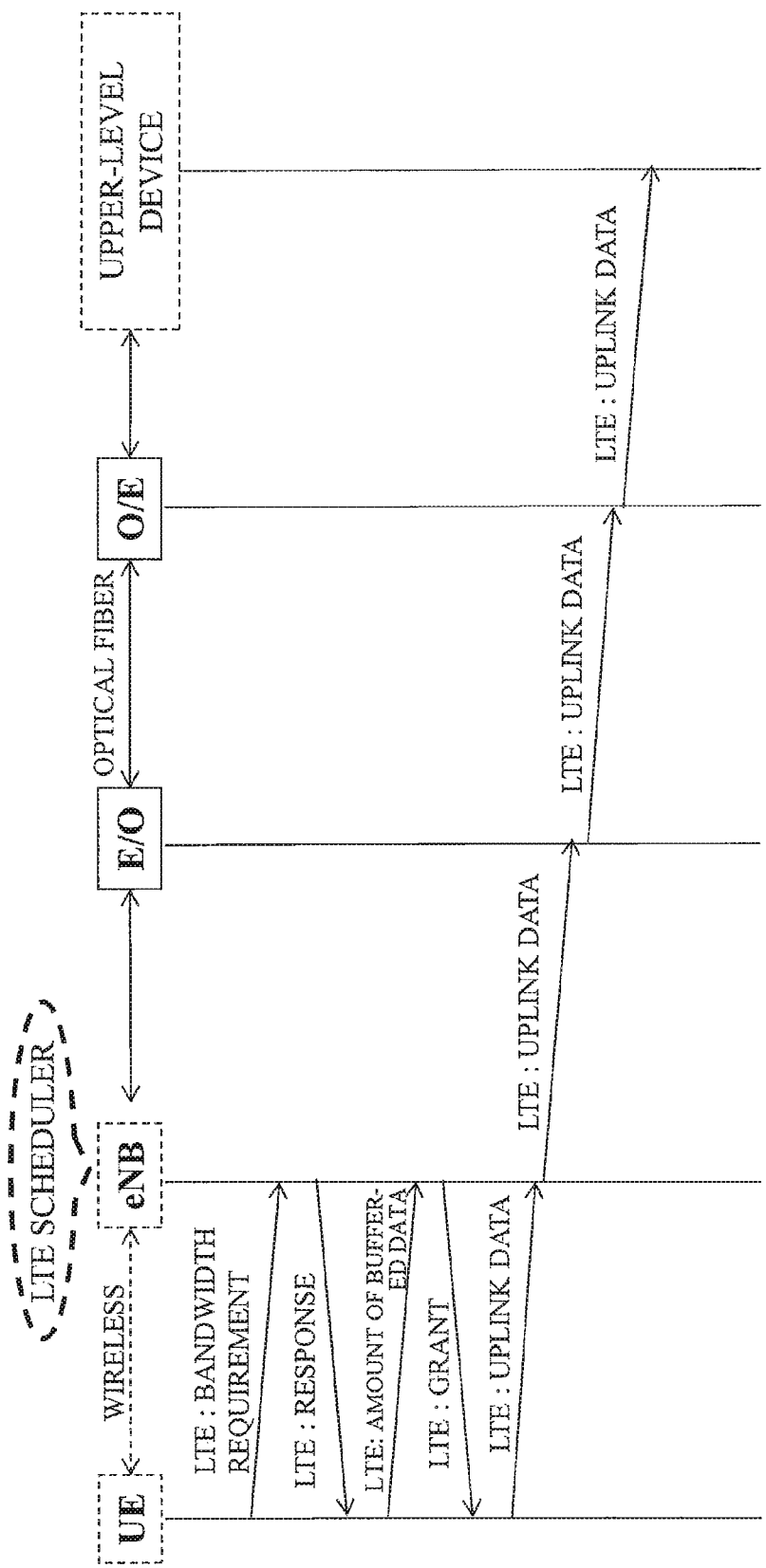
FIG. 13 is an example of an uplink communication sequence when an eNB and an upper-level device are connected in a point-to-point manner in an associated optical-wireless access system.
Figure 22:
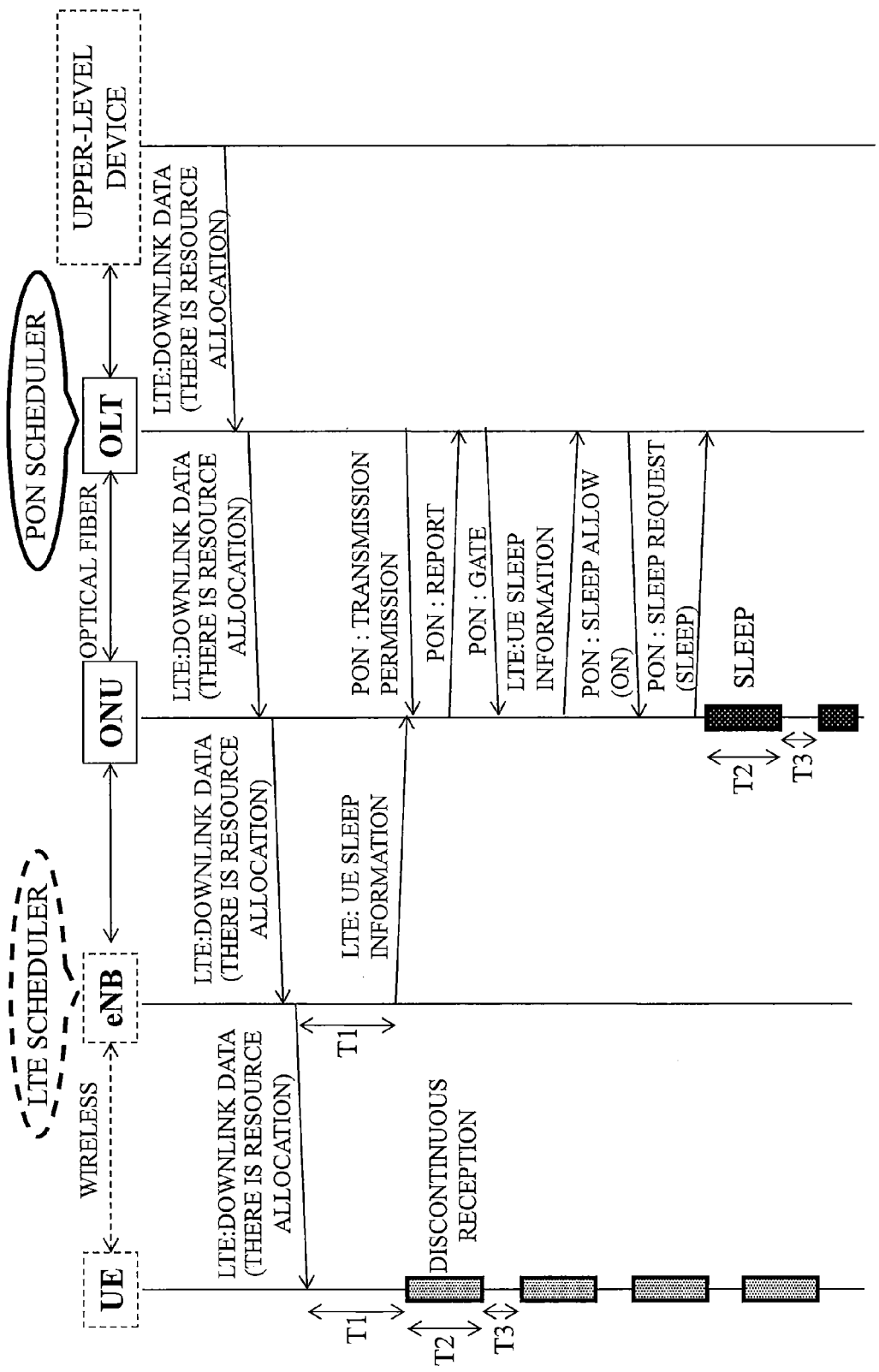
FIG. 22 is an example of discontinuous reception and a sleep start sequence during downlink communication in an optical-wireless access system according to Embodiment 3.
Figure 23:
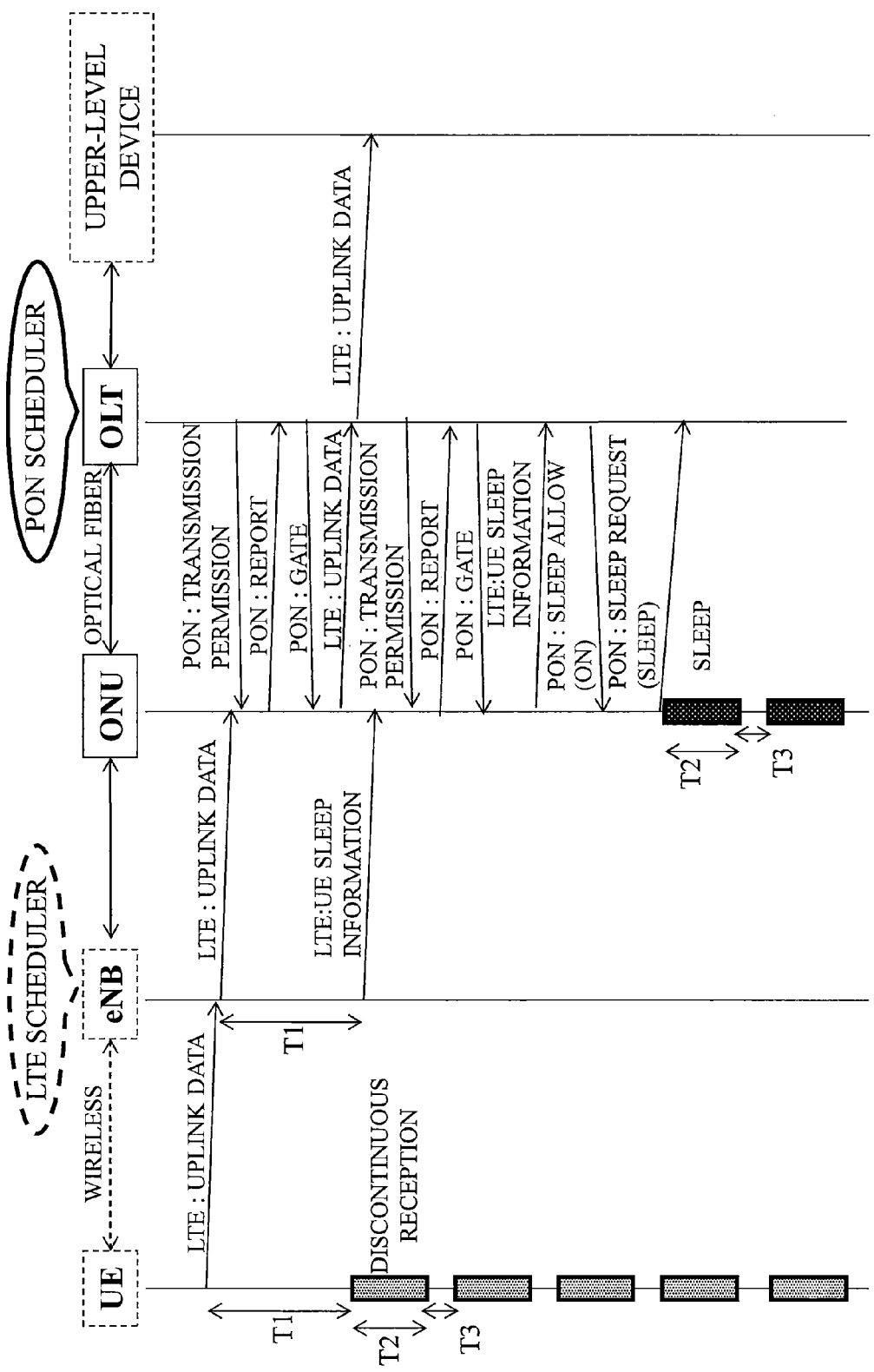
FIG. 23 is an example of discontinuous reception and a sleep start sequence during uplink communication in the optical-wireless access system according to Embodiment 3.

To solve the third problem, in a system applying a development technology, FIGS. 22 and 23 each show a sequence until an ONU of a PON shifts to a sleep state. More specifically, FIG. 22 shows a case where last traffic before the ONU shifts to discontinuous reception and the sleep state is downlink data, and FIG. 23 shows a case where the last traffic is uplink data. FIGS. 9 and 10 each show a sequence in the case where the development technology is not applied.

Figure 7:
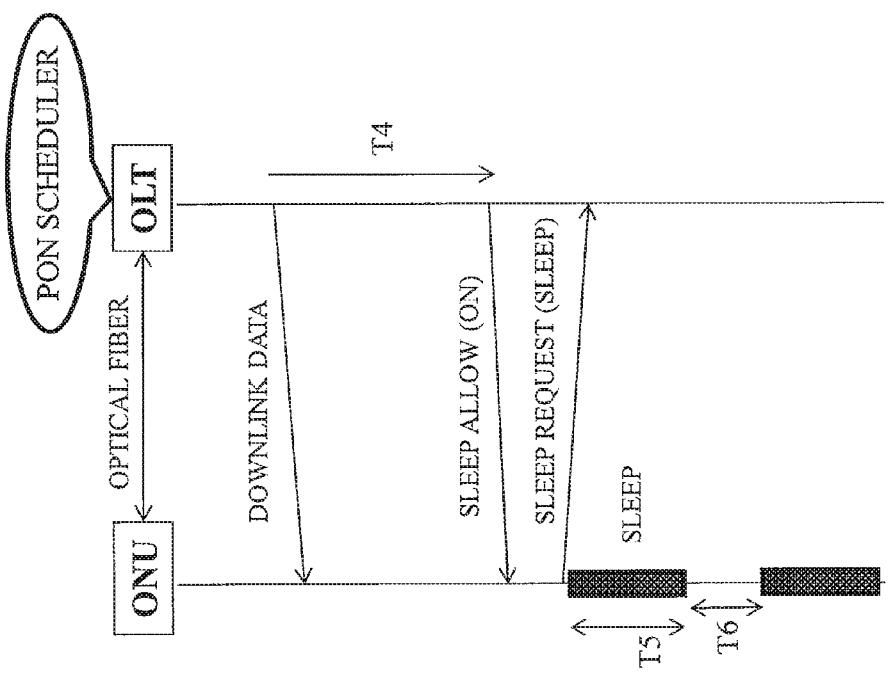
FIG. 7 is an example of a start sequence of sleep in the PON.
Figure 8:
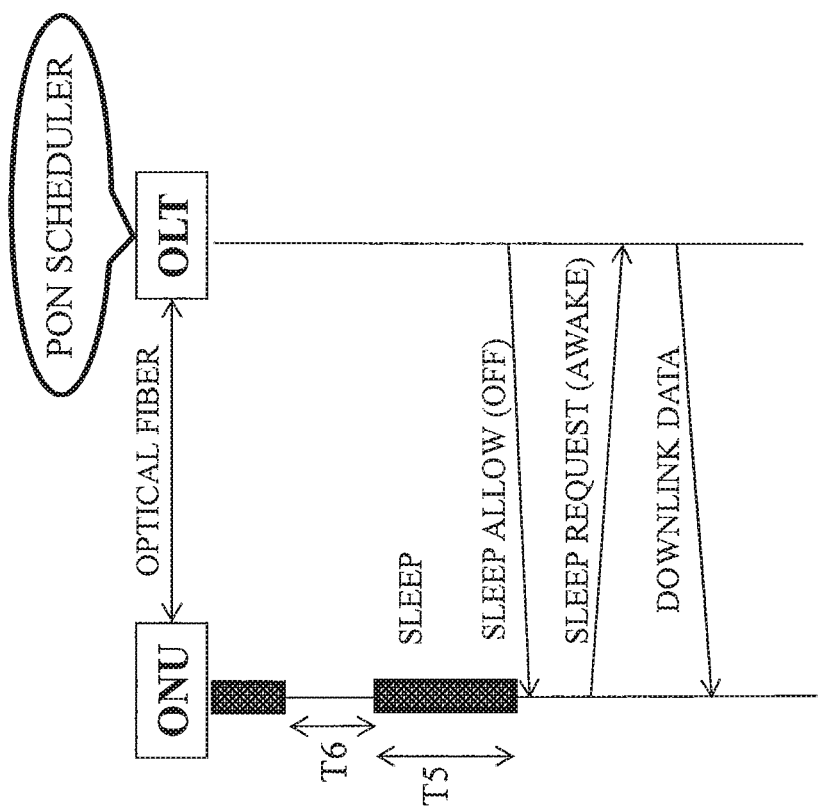
FIG. 8 is an example of a termination sequence of sleep in the PON.

The sequences shown in FIGS. 22 and 23 are different from the sequences shown in FIGS. 9 and 10, and when the OLT judges the shifting to the sleep state, the OLT uses UE discontinuous reception information instead of a timer for sleep control (T4 in FIG. 7)(or in addition to T4) in a PON. For both the cases of FIGS. 22 and 23, an eNB predicts, for each UE, whether each of the UEs is in an discontinuous reception state from the time when last traffic has occurred, using a timer and delivers the information, such as an discontinuous reception start time and cyclic parameters T2 and T3 of each of the UEs, to the ONU.

The ONU transfers the delivered information on the discontinuous reception in the UE to the OLT, and based on the delivered information and the information from the timer, the OLT judges the shifting of the ONU to the sleep state and calculates a sleep start timing of the ONU and cycles (T5 and T6) that minimizes a recovery waiting time in the eNB with respect to a downlink signal to the UE. When the ONU is to be shifted to the sleep state, the sleep parameter is rewritten, and the Sleep Allow (ON) is transmitted to the ONU so that the sleep start timing is defined as calculated.

Here, for the sake of simplicity, although one UE corresponds to one eNB in the above drawings, usually a plurality of UEs are connected to one eNB. In this case, the UEs each have a unique discontinuous reception starting time and a unique cyclic parameter, and the eNB delivers all the information to an ONU. The OLT which has received the information may determine the sleep start timing and the cycle of the ONU based on all the information, including determination whether the ONU is shifted to the sleep state. Alternatively, setting is performed so that the eNB regulates each discontinuous reception starting time and cyclic parameter of a plurality of the UEs so that the recovery cycle overlaps therewith as seen from the OLT, and the information may be delivered to the OLT. In the latter case, a longer sleep time of the ONU can be secured.

Figure 24:
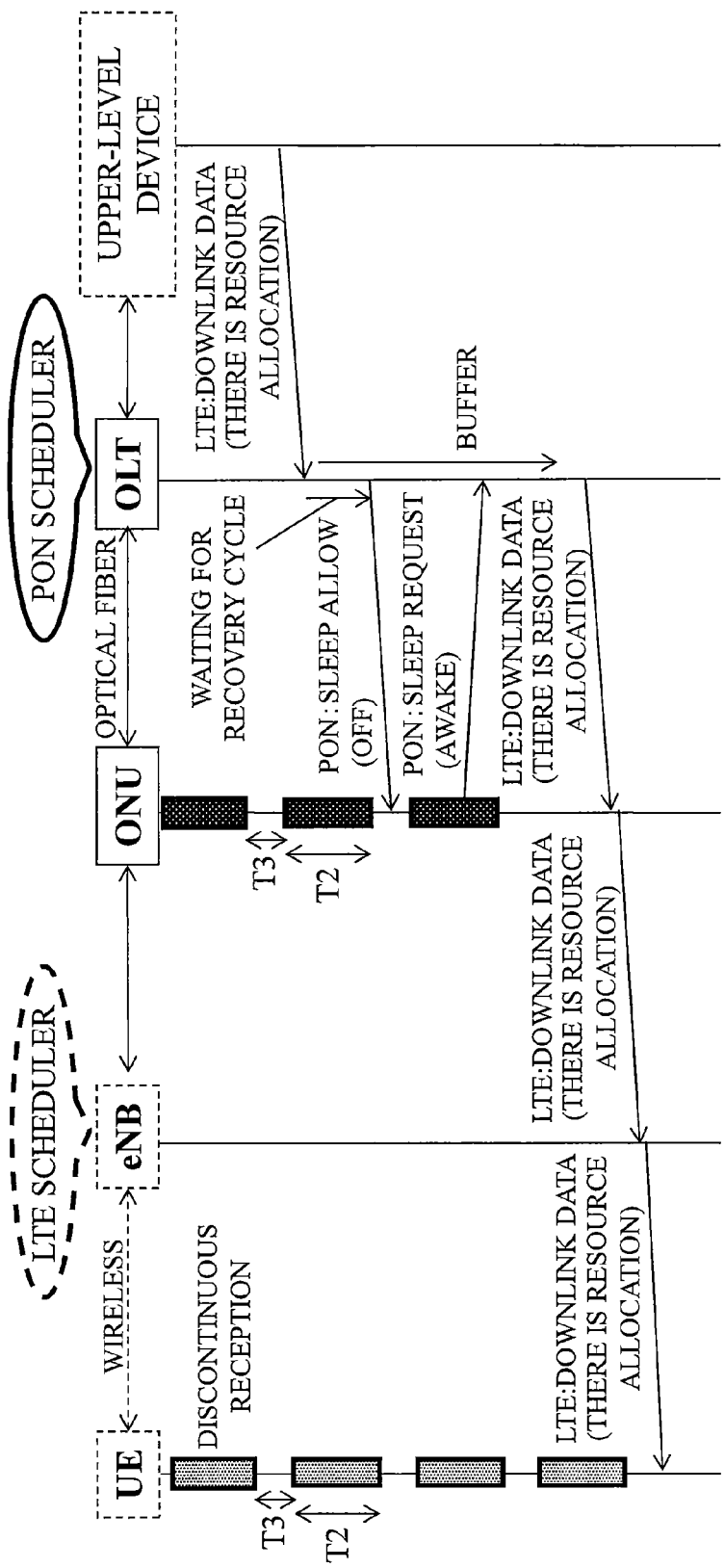
FIG. 24 is an example of a downlink communication sequence when the UE is in the discontinuous reception state, and the ONU is in the sleep state in the optical-wireless access system according to Embodiment 3.

When the sleep starts as shown in FIGS. 22 and 23, a sequence of downlink communication in which while the UE is in the discontinuous reception state, the ONU is in the sleep state is as shown in FIG. 24. In comparing FIG. 24 with FIG. 15 to which the development technique is not applied, the sleep of the ONU synchronizes with the discontinuous reception of the UE, and the OLT can transmit downlink data for aiming at each recovery cycle of the ONU and the UE; therefore, a buffer time for waiting for the recovery cycle of the downlink data in the eNB is reduced.

Figure 15:
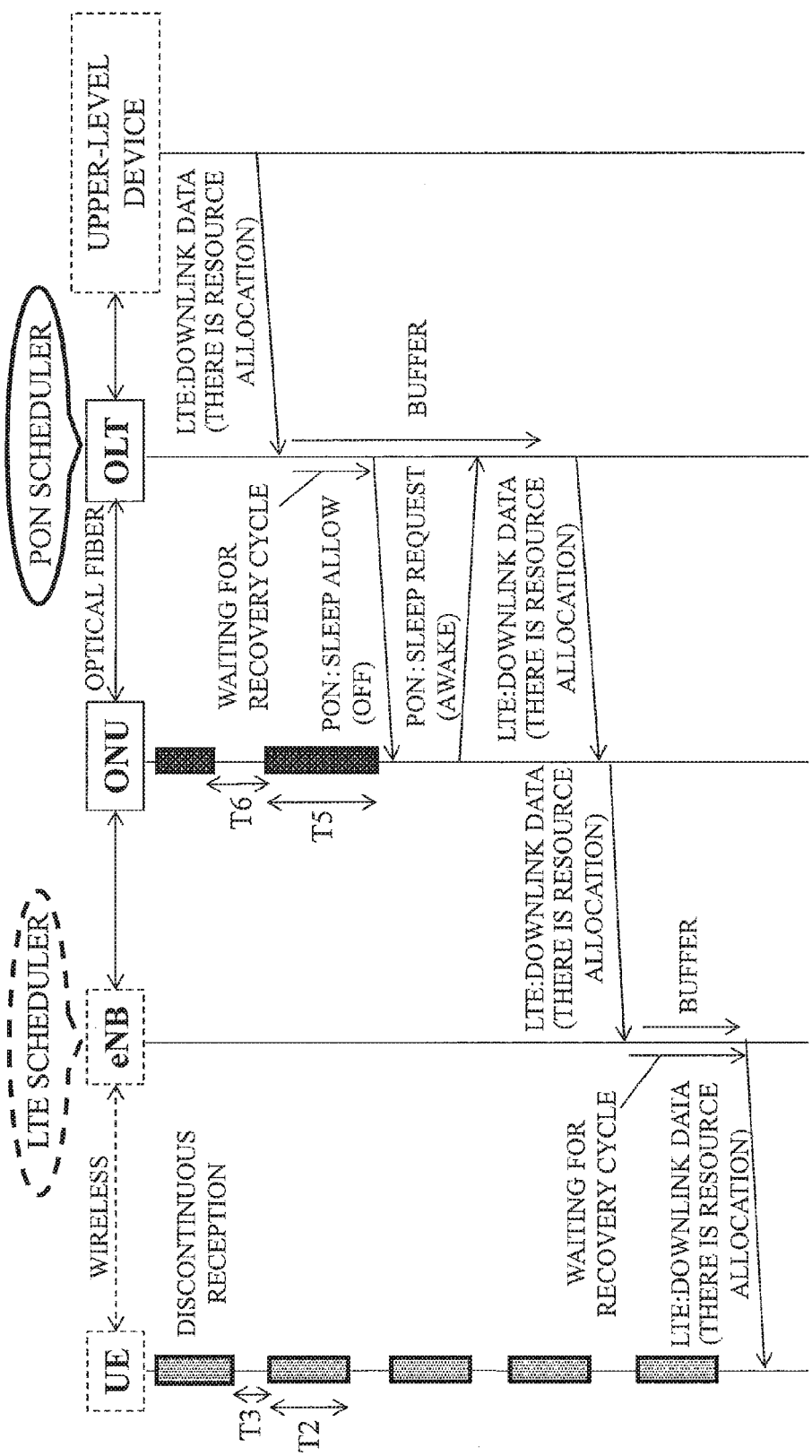
FIG. 15 shows an example of a downlink communication sequence when in an associated optical-wireless access system, an UE is in an discontinuous reception state, and the ONU is in the sleep state.

The total buffer time ranging from the upper-level device to the UE may not be reduced compared to FIG. 15; however, the buffer time in the eNB is reduced, so that the buffer time in the OLT is increased, whereby memories used for buffering can be collected on the upper-level side of a network in the entire system, and power saving and cost reduction can be expected.

Figure 25:
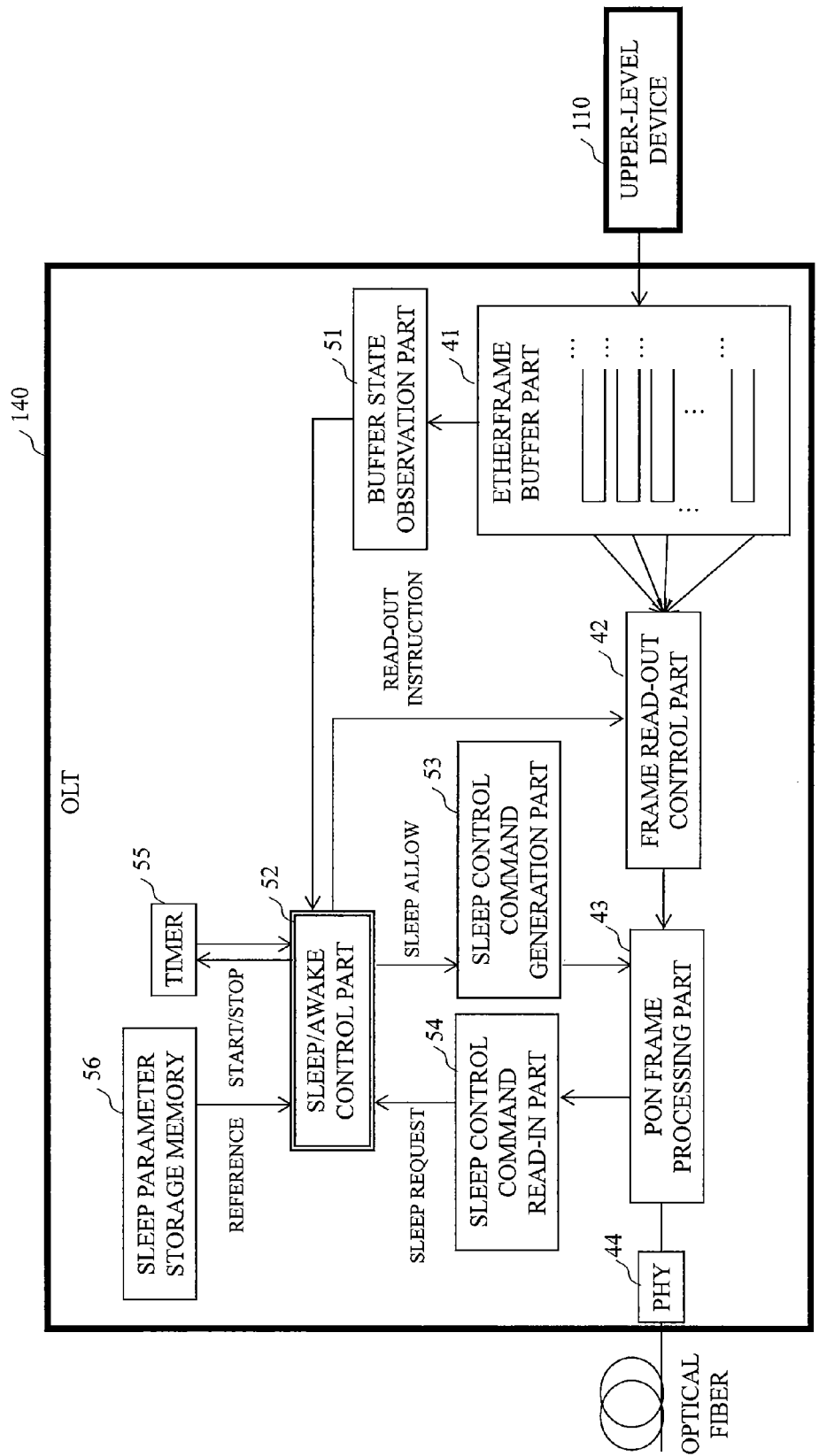
FIG. 25 is an example of the ONU related to this disclosure in Embodiment 3.

Although the example of the functional block diagram of the ONU for realizing the sleep control function of the PON is as shown in FIG. 20, a functional block diagram of an OLT corresponding to this is shown in FIG. 25. The OLT 140 includes an Etherframe buffer part 41, a frame read-out control part 42, a PON frame processing part 43, a PHY 44, a buffer state observation part 51, a sleep/awake control part 52, a sleep control command generation part 53, a sleep control command read-in part 54, a timer 55, and a sleep parameter storage memory 56. A portion irrelevant to the sleep control is omitted.

Usually when there is no sleep function, Etherframes of a downlink signal sent from an upper-level device are subjected to PON frame processing in the PON frame processing part 43 in the order of being read from the buffer part 41, converted into an optical signal by the PHY 44, and transmitted through an optical fiber. A core of the sleep function is the sleep/awake control part 52 which determines the sleep state of the ONU, and the sleep/awake control part 52 determines judgment of shifting of each of the ONUs to the active state and the sleep state based on an amount of the buffered Etherframe frames and a value of a timer.

The buffer state observation part 51 observes the buffer part 41 of the Etherframes and makes the sleep control command generation part 53 generate Sleep Allow (ON) so that the ONU in which there is no frame in the buffer part 41 is shifted to the sleep state once a time T4 has elapsed on the timer 55 from last uplink/downlink traffic.

Whether or not the ONU is in the sleep state is grasped from the fact that the sleep control command read-in part 54 has received Sleep Request (Sleep) from the ONU. When the buffer state observation part 51 detects a frame addressed to the ONU in the sleep state, the sleep/awake control part 52 makes the sleep control command generation part 53 generate the Sleep Allow (OFF) so that the ONU is shifted to the active state. In this case, the sleep/awake control part 52 can regulate a timing of generation of the sleep command so that the Sleep Allow (OFF) reaches the ONU for aiming at a time T6 when the ONU recovers from the sleep state.

Whether or not the ONU shifts to the active state is grasped by the fact that the sleep control command read-in part 54 has received the Sleep Request (Awake) from the ONU. When it is confirmed that the ONU is in the active state, the sleep/awake control part 52 instructs the frame read-out control part 42 to read out the frame addressed to the ONU from the buffer part 41, and a frame is transmitted to the ONU.

Figure 26:
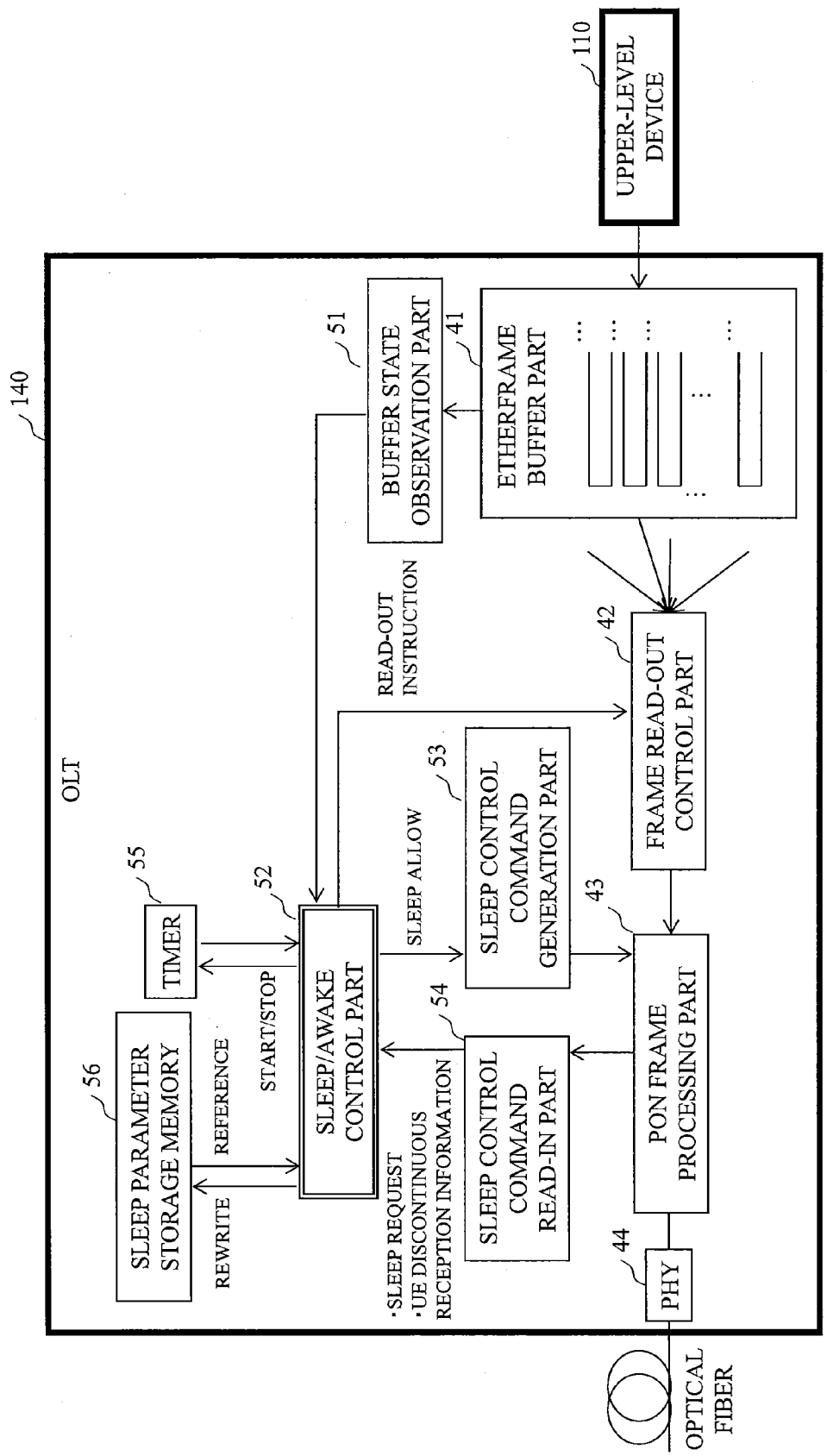
FIG. 26 is an example of the ONU according to Embodiment 3.

FIG. 26 shows a functional block relating to the sleep control in the case where a development technology is applied, with respect to an OLT 140 of FIG. 25 realizing the above sleep operation. The important point for the realization of the methods of FIGS. 22 and 23 is that the sleep/awake control part 52 of the OLT uses both the information on the timer 55 and the information on the discontinuous reception of the UE from the eNB transferred from the ONU for the judgment of the shifting of the ONU to the sleep state. Hereinafter, the details will be described.

Figure 27:
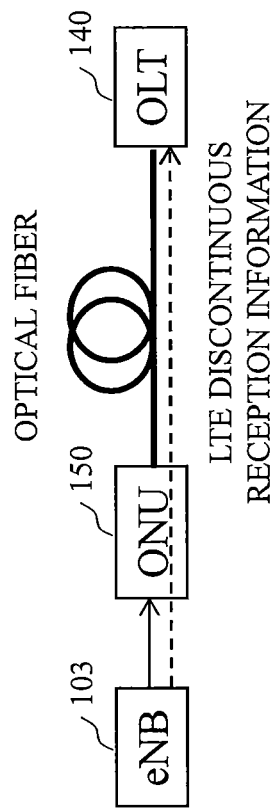
FIG. 27 is an example of a flow of discontinuous reception information according to Embodiment 3.

FIG. 27 shows a flow of the discontinuous reception information of the UE of a system applying a development technology. In FIG. 27, the eNB predicts whether each of the UEs is in the discontinuous reception state from the time when last traffic has occurred in each of the UEs, using the timer 55 and delivers the discontinuous reception information on one or a plurality of the UEs (such as an discontinuous reception starting time and the cyclic parameters T2 and T3) to the ONU. The ONU transfers the delivered discontinuous reception information on the one or the plurality of UEs to the OLT. In the transfer, a control frame of the PON may be used, or a data frame to which a specified VLAN-ID is allocated may be used.

In FIG. 26, the discontinuous reception information of the UE transferred to the OLT is received by the sleep/awake control part 52 through the sleep control command read-in part 54. Based on the information and the information on the timer, the sleep/awake control part 52 judges whether the ONU is shifted to the sleep state and calculates the sleep start timing and the cycle of the ONU that minimizes a recovery waiting time in the eNB with respect to a downlink signal to each of the UEs. Although it may be judged that the ONU does not shift to the sleep state depending on the calculation result, when the ONU is to shift to the sleep state as the result of the calculation, the sleep parameter storage memory 56 is rewritten based on the cyclic parameter as the calculated result, and a timing of issuing a command generation instruction to the sleep control command generation part 53 is regulated so that the sleep starting time is set as calculated, whereby the ONU is shifted to the sleep state.

In the above case, when the OLT transmits the downlink signal for aiming at a recovery time of the UE, the OLT should aim at the recovery time of the ONU, and therefore, the downlink signal is transmitted after previously waiting for the recovery cycle in the buffer part 41 in the OLT. Thus, the recovery waiting time in the OLT may be longer than that in a case where no development technology is applied. However, since a discontinuous reception recovery waiting time of the UE in the eNB should be reduced, memories for buffering can be collected on the upper-level side of a network in the entire system, and power saving and cost reduction can be expected.

In Embodiment 3, in the downlink communication in which while the UE is in the discontinuous reception state, the ONU is in the sleep state, the recovery cycle waiting time of the UE in the eNB can be reduced. Consequently, the amount of the memory for buffering in the eNB is reduced, and the memories are collected in the OLT on the upper-level side, whereby power saving and cost reduction may be realized.

Embodiment 4

Figure 28:
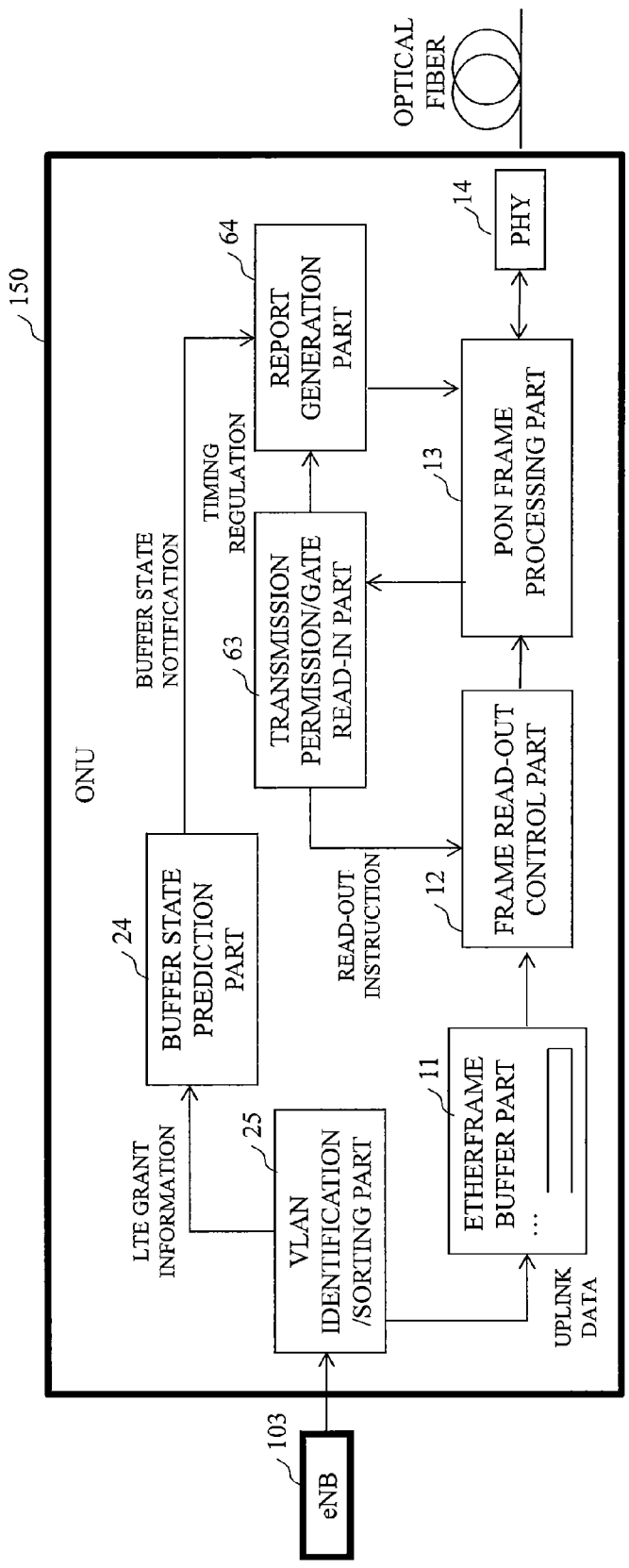
FIG. 28 is a first example of an ONU according to Embodiment 4.
Figure 29:
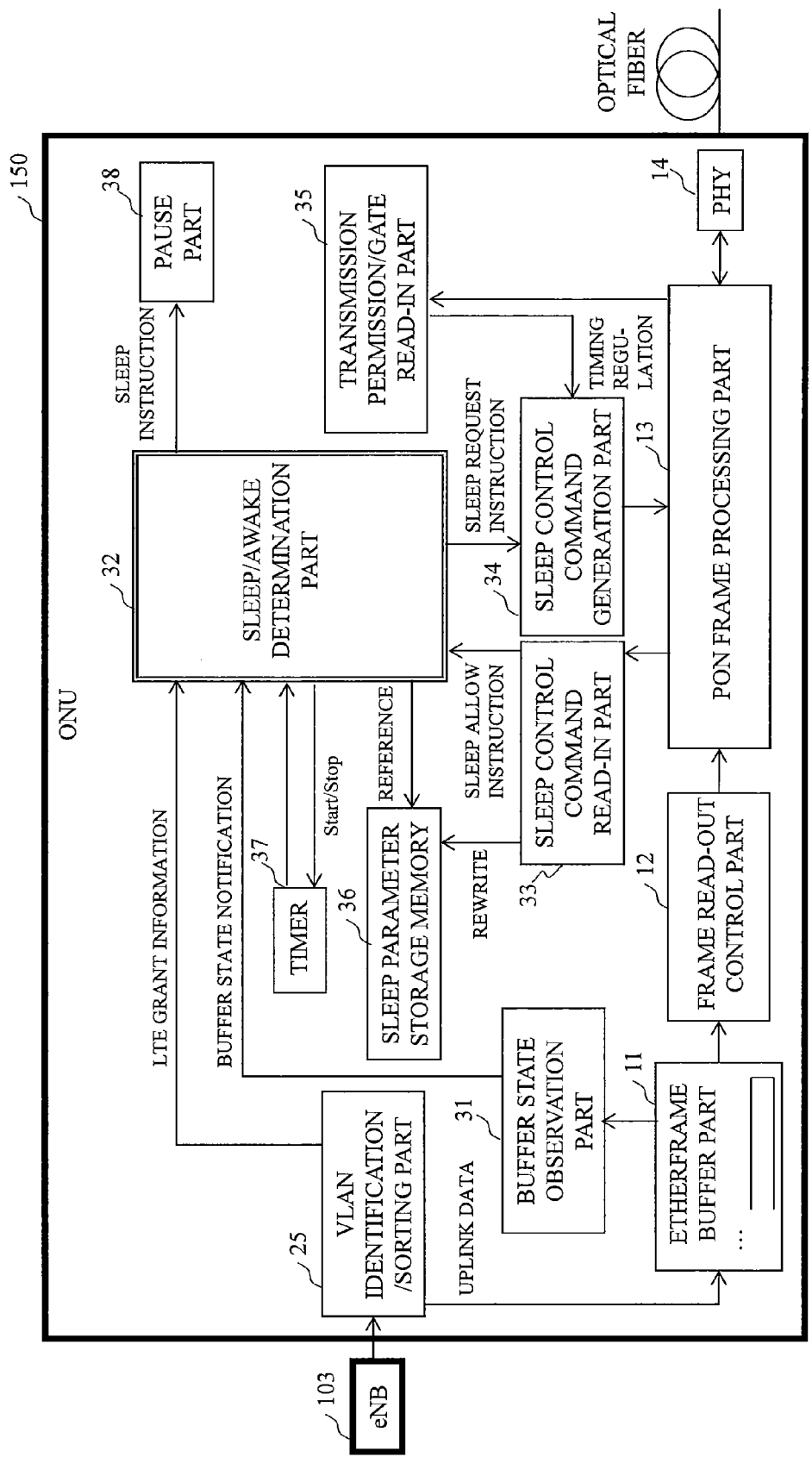
FIG. 29 is a second example of the ONU according to Embodiment 4.
Figure 30:
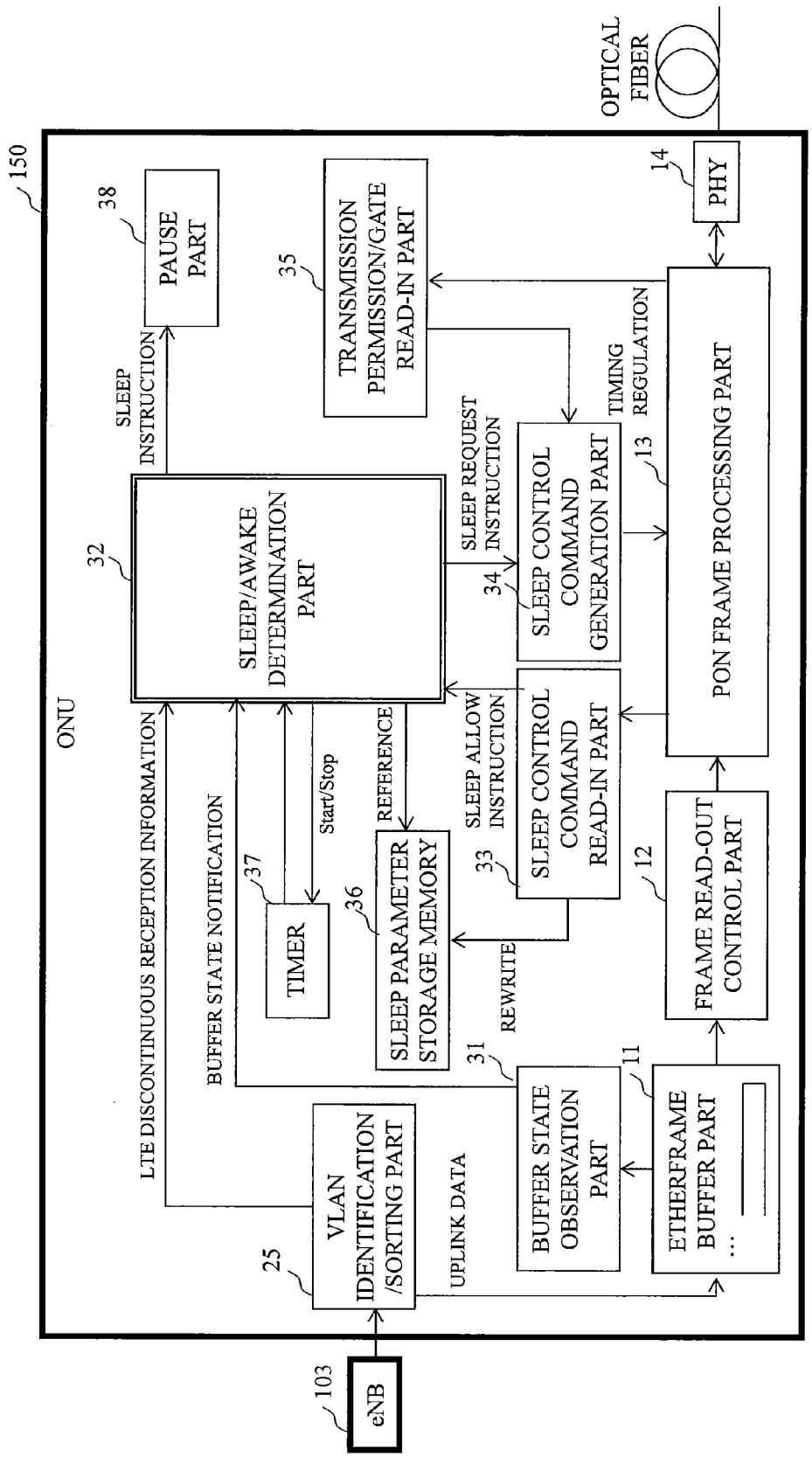
FIG. 30 is a third example of the ONU according to Embodiment 4.

In FIG. 18 of Embodiment 1, FIG. 21 of Embodiment 2, and FIG. 27 of Embodiment 3, when the grant information and the discontinuous reception information of the UE are transmitted from the eNB to the ONU, the line which is physically different from the line through which normal uplink data is transmitted is used; however, a physical line may be shared, and the grant information, the discontinuous reception information of the UE, and the normal uplink data may be identified by control protocol(s) in layer 2 or above. FIGS. 28, 29, and 30 each show an example using VLAN.

The number of the physical lines between the eNB and the ONU is one, and the eNB 103 transmits the grant information, the discontinuous reception information of the UE, and the normal uplink data, using different specific VLANs. An ONU 150 includes a VLAN identification/sorting part 25, and in the VLAN identification/sorting part 25, the grant information, the discontinuous reception information on the UE, and the normal uplink data are identified by a VLAN tag of a signal from the eNB, and the grant information, the discontinuous reception information on the UE, and the normal uplink data are sorted into a buffer state prediction part 24, a sleep/awake determination part 32, and an Etherframe buffer part 11, respectively.

Embodiment 5

Although in Embodiments 1 to 4 the eNB and the ONU are different devices and are connected via a physical line, in Embodiment 5 an integrated device having an eNB function and an ONU function is provided.

Embodiment 6

Although in Embodiment 3 the upper-level devices of the OLT and the LTE® are different devices and are connected via a physical line, in Embodiment 6 an integrated device having an OLT function and a function as an upper-level device of the LTE® is provided.

Embodiment 7

In the discontinuous reception, although one kind an discontinuous reception cycle parameter is used in the above embodiment, in some cases a plurality of stages of discontinuous reception cycles are provided, namely after the discontinuous reception for a fixed cycle T7, the discontinuous reception is performed in a cycle of T8 longer than T2. For example, in the LTE®, the parameter can be set with respect to two kinds of the discontinuous reception cycles, one of which is a short cycle and the other of which is a long cycle. In this case, although the number of the kinds of parameters including T7 and T8 is increased, their information is included in the discontinuous reception, information of the UE delivered from the eNB to the ONU.

Embodiment 8

Although the development technologies in Embodiments 1 to 3 are different means that solve the above problems, these development technologies are used in combination.

INDUSTRIAL APPLICABILITY

The present disclosure can be applied to information and communication industry.

REFERENCE SIGNS LIST

11: Etherframe buffer part.
12: frame read-out control part

13: PON frame processing part
14: PHY
21: buffer state observation part
22: transmission permission/GATE read-in part
23: REPORT generation part
24: buffer state prediction part
25: VLAN identification/sorting part
31: buffer state observation part
32: sleep/awake determination part
33: sleep control
34: sleep control command generation part
35: transmission permission/GATE read-in part
36: sleep parameter storage memory
37: timer
38: pause part
39: VLAN identification/sorting part
101: UE
103: eNB
110: upper-level device
130: PON
140: OLT
150: ONU

What is claimed is:

1. An optical-wireless access system in which one or more base stations communicating with a wireless terminal are connected to an upper-level device via an optical access system,
the optical access system comprising one or more optical network units (ONUs) arranged on the base station side, an optical line terminal (OLT) disposed on the upper-level device side, and optical transmission paths through which the ONUs and the OLT are connected,
the ONU obtaining information on dynamic scheduling control or discontinuous reception control of the optical-wireless access system from the base station, and
the OLT determining whether or not the ONU should be slept, using the information on the discontinuous reception of the wireless terminal and calculating a sleep start timing and a cycle of the ONU that minimize a waiting time in the base station of downlink data of the wireless terminal.

2. A method of operating an optical-wireless access system in which one or more base stations communicating with a wireless terminal are connected to an upper-level device via an optical access system, wherein the optical access system includes one or more optical network units (ONUs) arranged on the base station side, an optical line terminal (OLT) disposed on the upper-level device side, and an optical transmission path through which the ONUs and the OLT are connected, and wherein the method comprises:
obtaining, by the ONU, information on dynamic scheduling control or discontinuous reception control of the optical-wireless access system from the base station; and
determining, by the OLT, whether or not the ONU should be slept, using the information on the discontinuous reception of the wireless terminal and calculating a sleep start timing and a cycle of the ONU that minimize a waiting time in the base station of downlink data of the wireless terminal.

3. An OLT in an optical-wireless access system in which one or more base stations communicating with a wireless terminal are connected to an upper-level device via an optical access system, comprising:
one or more optical network units (ONUs) arranged on the base station side,
the optical line terminal (OLT) being disposed on the upper level device side, and
optical transmission paths through which the ONUs and the OLT are connected,
wherein the base stations generate information on dynamic scheduling control or discontinuous reception control of the optical-wireless access system being obtained from the ONU, and
wherein the OLT determines whether or not the ONU should be slept, using the information on the discontinuous reception of the wireless terminal and calculating a sleep start timing and a cycle of the ONU that minimize a waiting time in the base station of downlink data of the wireless terminal.

4. An ONU in an optical-wireless access system in which one or more base stations communicating with a wireless terminal are connected to an upper-level device via an optical access system and which comprises one or more optical network units (ONUs) arranged on the base station side, an optical line terminal (OLT) disposed on the upper-level device side, and an optical transmission path through which the ONU and the OLT are connected, and
the ONU obtaining information on dynamic scheduling control or discontinuous reception control of the optical-wireless access system from the base station, and
the ONU receiving grant information transmitted from the base station to the wireless terminal and starting a sequence of transmitting uplink data to the OLT in the wake of reception of the grant information.

5. The ONU according to claim 4, obtaining information on dynamic scheduling control or discontinuous reception control of the optical-wireless access system, using a line which is physically different from a line through which normal uplink data is transmitted.

6. The ONU according to claim 5, comprising:
a buffer state prediction part which predicts a frame amount in a buffer of uplink data transmitted to the OLT based on the grant information transmitted from the base station to the wireless terminal; and
a REPORT generation part which generates a REPORT message based on an amount of buffered data notified from the buffer state prediction part.

7. The ONU according to claim 6, receiving the grant information transmitted from the base station to the wireless terminal once the base station has determined the grant information and, in the wake of the reception of the grant information, starting to shift from a sleep state to an active state.

8. The ONU according to claim 4, obtaining information on dynamic scheduling control or discontinuous reception control of the optical-wireless access system, using control protocol(s) in layer 2 or above.

9. The ONU according to claim 8, comprising:
a buffer state prediction part which predicts a frame amount in a buffer of uplink data transmitted to the OLT based on the grant information transmitted from the base station to the wireless terminal; and
a REPORT generation part which generates a REPORT message based on an amount of buffered data notified from the buffer state prediction part.

10. The ONU according to claim 9, receiving the grant information transmitted from the base station to the wireless terminal once the base station has determined the grant information and, in the wake of the reception of the grant information, starting to shift from a sleep state to an active state.

11. The ONU according to claim 8, receiving the grant information transmitted from the base station to the wireless terminal once the base station has determined the grant information and, in the wake of the reception of the grant information, starting to shift from a sleep state to an active state.

12. The ONU according to claim 4, comprising:
a buffer state prediction part which predicts a frame amount in a buffer of uplink data transmitted to the OLT based on the grant information transmitted from the base station to the wireless terminal; and
a REPORT generation part which generates a REPORT message based on an amount of buffered data notified from the buffer state prediction part.

13. The ONU according to claim 12, receiving the grant information transmitted from the base station to the wireless terminal once the base station has determined the grant information and, in the wake of the reception of the grant information, starting to shift from a sleep state to an active state.

14. The ONU according to claim 4, comprising:
a buffer state prediction part which predicts a frame amount in a buffer of uplink data transmitted to the OLT based on the grant information transmitted from the base station to the wireless terminal; and
a REPORT generation part which generates a REPORT message based on an amount of buffered data notified from the buffer state prediction part.

15. The ONU according to claim 14, receiving the grant information transmitted from the base station to the wireless terminal once the base station has determined the grant information and, in the wake of the reception of the grant information, starting to shift from a sleep state to an active state.

16. An ONU in an optical-wireless access system in which one or more base stations communicating with a wireless terminal are connected to an upper-level device via an optical access system and which comprises one or more optical network units (ONUs) arranged on the base station side, an optical line terminal (OLT) disposed on the upper-level device side, and an optical transmission path through which the ONU and the OLT are connected, and
the ONU obtaining information on dynamic scheduling control or discontinuous reception control of the optical-wireless access system from the base station, and receiving grant information transmitted from the base station to the wireless terminal once the base station has determined the grant information and, in the wake of the reception of the grant information, starting to shift from a sleep state to an active state.

* * * * *

UNITED STATES PATENT AND TRADEMARK OFFICE
CERTIFICATE OF CORRECTION

PATENT NO. : 9,788,270 B2  
APPLICATION NO. : 14/654783  
DATED : October 10, 2017  
INVENTOR(S) : Iiyama et al.

Page 1 of 1

It is certified that error appears in the above-identified patent and that said Letters Patent is hereby corrected as shown below:

On the Title Page

Under "Inventors",
Item (72) - please correct first inventor's last name: "Ilyama" to -- Iiyama --.

Signed and Sealed this
Twenty-seventh Day of February, 2018

Andrei Iancu
*Director of the United States Patent and Trademark Office*